United States Patent
Liao et al.

(10) Patent No.: US 9,557,534 B1
(45) Date of Patent: Jan. 31, 2017

(54) PHOTOGRAPHING OPTICAL LENS ASSEMBLY, IMAGE CAPTURING UNIT AND ELECTRONIC DEVICE

(71) Applicant: LARGAN Precision Co.,Ltd., Taichung (TW)

(72) Inventors: Lin-Yao Liao, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/869,301

(22) Filed: Sep. 29, 2015

(30) Foreign Application Priority Data

Aug. 26, 2015 (TW) .............. 104127951 A

(51) Int. Cl.
*G02B 9/62* (2006.01)
*G02B 13/00* (2006.01)
*G02B 27/00* (2006.01)

(52) U.S. Cl.
CPC ............ *G02B 13/0045* (2013.01); *G02B 9/62* (2013.01); *G02B 27/0025* (2013.01)

(58) Field of Classification Search
CPC .... G02B 13/0045; G02B 9/62; G02B 27/0025
See application file for complete search history.

(56) References Cited

U.S. PATENT DOCUMENTS 7,995,291 B2    8/2011  Yamamoto
2014/0368931 A1*  12/2014  Noda ............... G02B 9/62
                                                    359/740

FOREIGN PATENT DOCUMENTS

| JP | 2014010399 | 1/2014 |
| JP | 2014010400 | 1/2014 |
| JP | 2014010401 | 1/2014 |
| JP | 2014044250 | 3/2014 |
| TW | I479190 B | 4/2015 |

* cited by examiner

*Primary Examiner* — Joseph P Martinez
(74) *Attorney, Agent, or Firm* — Maschoff Brennan

(57) ABSTRACT

A photographing optical lens assembly includes, in order from an object side to an image side, a first lens element, a second lens element, a third lens element, a fourth lens element, a fifth lens element and a sixth lens element. The first lens element with negative refractive power has an image-side surface being concave in a paraxial region thereof. The fourth lens element has an image-side surface being concave in a paraxial region thereof. The sixth lens element with negative refractive power has an object-side surface being concave in a paraxial region thereof and an image-side surface being concave in a paraxial region thereof, wherein the image-side surface of the sixth lens element has at least one convex shape in an off-axis region thereof, and both two surfaces thereof are aspheric. The first through sixth lens element are all single and non-cemented lens elements.

22 Claims, 17 Drawing Sheets

PHOTOGRAPHING OPTICAL LENS ASSEMBLY, IMAGE CAPTURING UNIT AND ELECTRONIC DEVICE

RELATED APPLICATIONS

This application claims priority to Taiwan Application 104127951, filed Aug. 26, 2015, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced, and compact optical systems have gradually evolved toward the field of higher megapixels, there is an increasing demand for compact optical systems featuring better image quality.

A conventional optical system employed in a portable electronic product mainly adopts a five-element lens structure. Due to the popularity of mobile terminals with high-end specifications, such as smart phones, wearable devices and tablet personal computers, the requirements for high resolution and image quality of present compact optical systems increase significantly. However, the conventional optical systems cannot satisfy these requirements of the compact optical systems.

Other conventional compact optical systems with six-element lens structure are developed. However, the conventional optical system with wide field of view has the shortcoming of overly long total track length so that it is unfavorable for simultaneously satisfying the requirements of wide field of view and compact size.

SUMMARY

According to one aspect of the present disclosure, a photographing optical lens assembly includes, in order from an object side to an image side, a first lens element, a second lens element, a third lens element, a fourth lens element, a fifth lens element, and a sixth lens element. The first lens element with negative refractive power has an image-side surface being concave in a paraxial region thereof. The fourth lens element has an image-side surface being concave in a paraxial region thereof. The sixth lens element with negative refractive power has an object-side surface being concave in a paraxial region thereof and an image-side surface being concave in a paraxial region thereof, wherein the image-side surface of the sixth lens element has at least one convex shape in an off-axis region thereof, and both the object-side surface and the image-side surface of the sixth lens element are aspheric. The photographing optical lens assembly has a total of six lens elements. The first lens element, the second lens element, the third lens element, the fourth lens element, the fifth lens element and the sixth lens element are all single and non-cemented lens elements. An axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$T12/T56<4.0$; and $1.80<(T12+T56)/(T23+T34+T45)$.

According to another aspect of the present disclosure, an image capturing unit includes the aforementioned photographing optical lens assembly and an image sensor, wherein the image sensor is disposed on the image side of the photographing optical lens assembly.

According to still another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
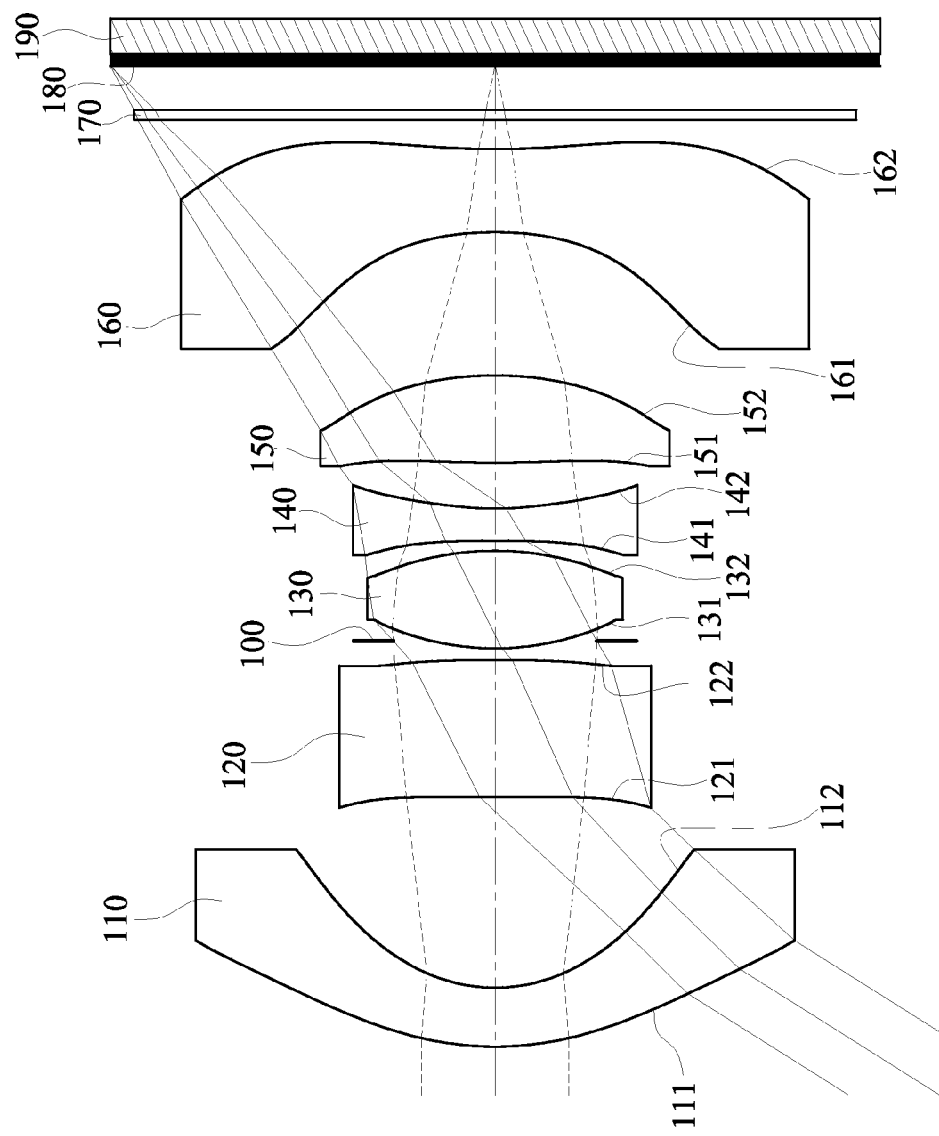
FIG. 1 is a schematic view of an image capturing unit according to the 1st embodiment of the present disclosure.

A photographing optical lens assembly includes, in order from an object side to an image side, a first lens element, a second lens element, a third lens element, a fourth lens element, a fifth lens element and a sixth lens element. The photographing optical lens assembly has a total of six lens elements.

According to the photographing optical lens assembly of the present disclosure, there is an air gap in a paraxial region arranged between every two of the first lens element, the second lens element, the third lens element, the fourth lens element, the fifth lens element and the sixth lens element that are adjacent to each other, that is, each of the first through sixth lens elements of the photographing optical lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there is an air gap in a paraxial region between every two of the lens elements that are adjacent to each other in the present disclosure for solving the problem of the cemented lens elements.

The first lens element with negative refractive power has an image-side surface being concave in a paraxial region thereof. Therefore, the first lens element provides the photographing system with sufficient negative refractive power so as to enlarge the field of view and improve the image quality.

The second lens element can have an object-side surface being concave in a paraxial region thereof and an image-side surface being convex in a paraxial region thereof. Therefore, it is favorable for correcting the astigmatism so as to improve the image quality.

The third lens element can have positive refractive power. Therefore, it is favorable for reducing a total track length of the photographing optical lens assembly so as to maintain a compact size thereof.

The fourth lens element can have negative refractive power. The fourth lens element can have an object-side surface having at least one concave shape in an off-axis region thereof and an image-side surface being concave in a paraxial region thereof. Therefore, it is favorable for correcting the aberration of the paraxial field and the off-axis field.

The fifth lens element can have at least one of an object-side surface and an image-side surface having at least one inflection point. Therefore, it is favorable for correcting the aberration of the off-axis field so as to improve the image quality at the off-axis region.

The sixth lens element with negative refractive power has an object-side surface being concave in a paraxial region thereof and an image-side surface being concave in a paraxial region thereof, wherein the image-side surface of the sixth lens element has at least one convex shape in an off-axis region thereof. Therefore, the refractive power distribution of the first through sixth lens elements and the shape of the sixth lens element are favorable for enlarging the field of view and reducing the total track length of the photographing optical lens assembly so as to further improve the image quality. Furthermore, it is favorable for effectively reducing the incident angle of the light projecting onto the image sensor so as to improve the image-sensing efficiency of the image sensor, and thereby effectively correcting the aberration of the off-axis field.

When an axial distance between the first lens element and the second lens element is T12, an axial distance between the fifth lens element and the sixth lens element is T56, the following condition is satisfied: $T12/T56<4.0$. Therefore, the effective imaging areas of the first lens element and the sixth lens element is more proper so that it is favorable for effectively correcting the aberration and the distortion when the two surfaces of the sixth lens element are both aspheric, and thereby further improving the image quality. Preferably, the following condition can also be satisfied: $T12/T56<2.0$. More preferably, the following condition can also be satisfied: $T12/T56<1.5$.

When the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, the axial distance between the fifth lens element and the sixth lens element is T56, the following condition is satisfied: $1.80<(T12+T56)/(T23+T34+T45)$. Therefore, the axial distances between every adjacent two of the second lens element, the third lens element, the fourth lens element and the fifth lens element are properly arranged so that it is favorable for the photographing optical lens assembly simultaneously satisfying the requirements of wide field of view, compact size and high image quality. Preferably, the following condition can also be satisfied: $3.0<(T12+T56)/(T23+T34+T45)$.

When a maximum chief ray angle of the photographing optical lens assembly is CRA, half of a maximal field of view of the photographing optical lens assembly is HFOV, the following conditions can be satisfied: 30 degrees (deg.) $<CRA<45$ deg.; and 50 deg.$<HFOV<85$ deg. Therefore, it is favorable for effectively reducing the angle of the incident light projecting onto the image sensor so as to improve the image-sensing efficiency of the image sensor, and thereby improving the image quality and enlarging the field of view.

According to the present disclosure, the photographing optical lens assembly further includes a stop disposed on the shortest distance among axial distances between any two of the first lens element, the second lens element, the third lens element, the fourth lens element, the fifth lens element and the sixth lens element that are adjacent to each other. Therefore, it is favorable for enlarging the field of view.

When the axial distance between the first lens element and the second lens element is T12, the axial distance between the fifth lens element and the sixth lens element is T56, an axial distance between the image-side surface of the sixth lens element and an image surface is BL, the following condition can be satisfied: $2.5<(T12+T56)/BL<6.0$. Therefore, it is favorable for reducing a back focal length of the photographing optical lens assembly so as to maintain a compact size thereof.

Figure 15:
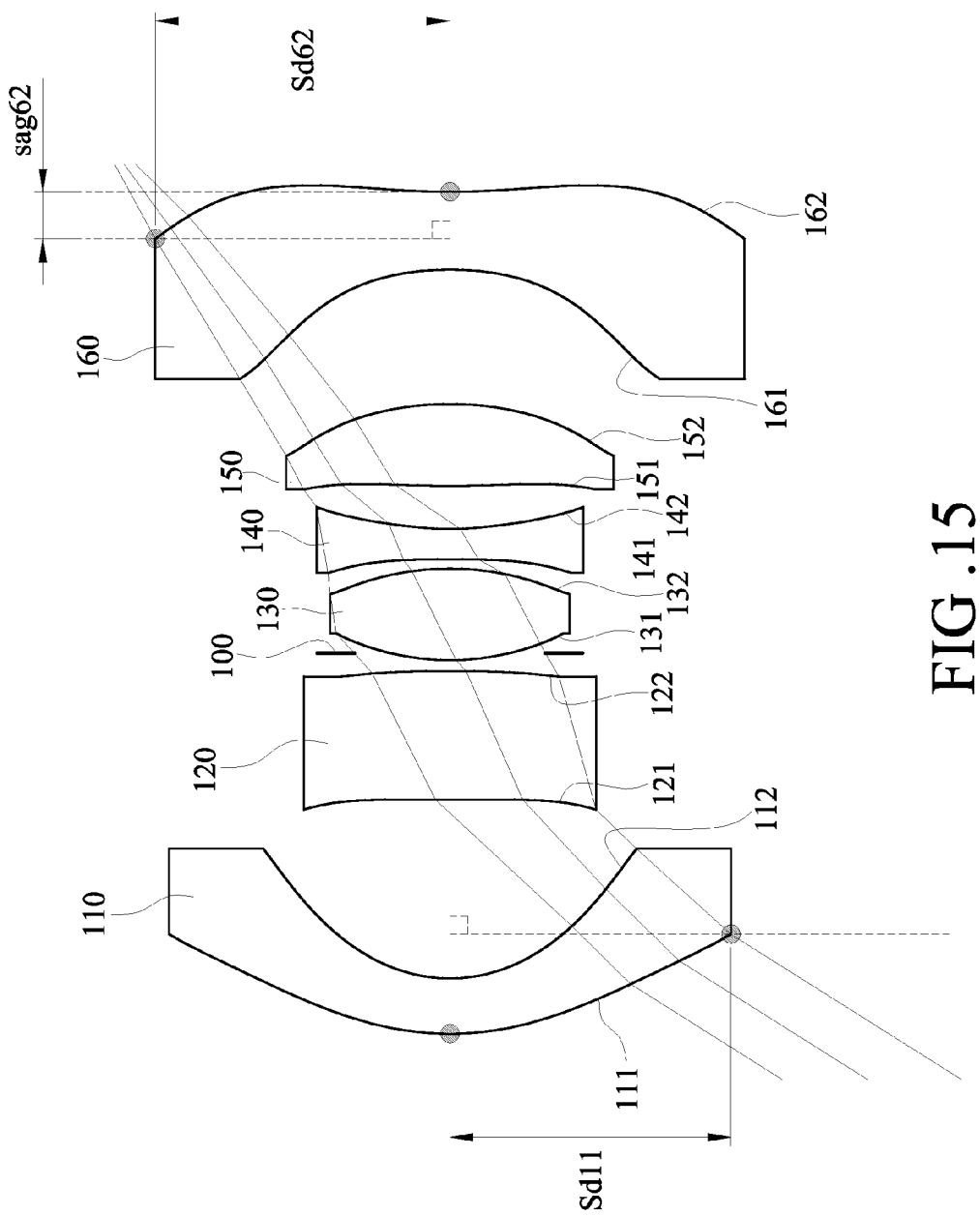
FIG. 15 is a schematic view of Sd11, Sd62 and sag62 in FIG. 1.

When a maximum effective radius of an object-side surface of the first lens element is Sd11, a maximum effective radius of the image-side surface of the sixth lens element is Sd62, the following condition can be satisfied: $0.80<|Sd11/Sd62|<1.10$. Therefore, the difference between a diameter of the first lens element and a diameter of the sixth lens element is reduced so that it is favorable for assembling the lens elements with a stable yield rate. As seen in FIG. 15, it shows a schematic view of Sd11 and Sd62 of the photographing optical lens assembly from FIG. 1.

When a curvature radius of the object-side surface of the sixth lens element is R11, a curvature radius of the image-side surface of the sixth lens element is R12, the following condition can be satisfied: −0.75<(R11+R12)/(R11−R12)<0. Therefore, it is favorable for correcting the aberration so as to improve the image quality.

When an Abbe number of the second lens element is V2, an Abbe number of the fourth lens element is V4, the following condition can be satisfied: 35<V2+V4<85. Therefore, it is favorable for correcting the chromatic aberration and the astigmatism.

When a focal length of the photographing optical lens assembly is f, a focal length of the third lens element is f3, a focal length of the fourth lens element is f4, the following condition can be satisfied: 2.0<(f/f3)−(f/f4)<4.0. Therefore, it is favorable for reducing the sensitivity of the photographing optical lens assembly and further correcting the aberration.

When a central thickness of the second lens element is CT2, a central thickness of the third lens element is CT3, a sum of central thicknesses of the first lens element, the second lens element, the third lens element, the fourth lens element, the fifth lens element and the sixth lens element is ΣCT, the following condition can be satisfied: ΣCT/(CT2+CT3)<2.5. Therefore, the central thicknesses of the lens elements are proper so that it is favorable for assembling the lens elements so as to increase the manufacturing yield rate.

When a distance in parallel with an optical axis from an intersection point of the image-side surface of the sixth lens element and the optical axis to a position of the maximum effective radius of the image-side surface of the sixth lens element is sag62, the central thickness of the sixth lens element is CT6, the following condition can be satisfied: −1.5<sag62/CT6<−0.30. Therefore, it is favorable for correcting the aberration at the off-axis region and providing sufficient relative illumination. As seen in FIG. 15, it shows a schematic view of sag62 of the photographing optical lens assembly from FIG. 1. When the direction from the intersection point of the image-side surface of the sixth lens element and the optical axis to the position of the maximum effective radius of the image-side surface of the sixth lens element is facing towards the image side of the photographing optical lens assembly, the sag62 is positive; otherwise, the sag62 is negative.

When a focal length of the first lens element is f1, a focal length of the second lens element is f2, the focal length of the third lens element is f3, the focal length of the fourth lens element is f4, a focal length of the fifth lens element is f5, a focal length of the sixth lens element is f6, a focal length of the i-th lens element is fi, the following condition can be satisfied: |f2|>|fi|, wherein i=1, 3, 4, 5, 6. Therefore, it is favorable for effectively minimizing the degree of refraction of the incident light so as to prevent excessive aberrations.

When the axial distance between the first lens element and the second lens element is T12, the axial distance between the fifth lens element and the sixth lens element is T56, an axial distance between an object-side surface of the third lens element and the image-side surface of the fifth lens element is Dr5r10, the following condition can be satisfied: 0.80<(T12+T56)/Dr5r10. Therefore, the axial distances between adjacent lens elements are proper for reducing the total track length of the photographing optical lens assembly.

According to the present disclosure, an aperture stop can be configured as a front stop or a middle stop. A front stop disposed between an imaged object and the first lens element can produce a telecentric effect by providing a longer distance between an exit pupil and the image surface and thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the photographing optical lens assembly can be made of glass or plastic material. When the lens elements are made of glass material, the refractive power distribution of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than a spherical surface so as to have more controllable variables for eliminating the aberration thereof, and to further decrease the required number of the lens elements. Therefore, the total track length of the photographing optical lens assembly can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing optical lens assembly, based on the corresponding image sensor, can be flat or curved, particularly a curved surface being concave facing towards the object side of the photographing optical lens assembly.

According to the present disclosure, the photographing optical lens assembly can include at least one stop, such as an aperture stop, a glare stop or a field stop. Said glare stop or said field stop is allocated for eliminating the stray light and thereby improving the image quality thereof.

According to the present disclosure, an image capturing unit is provided. The image capturing unit includes the aforementioned photographing optical lens assembly of the present disclosure, and an image sensor, wherein the image sensor is disposed on the image side of the aforementioned photographing optical lens assembly, that is, the image sensor can be disposed on or near an image surface of the aforementioned photographing optical lens assembly. In some embodiments, the image capturing unit can further include a barrel member, a holding member or a combination thereof.

Figure 17:
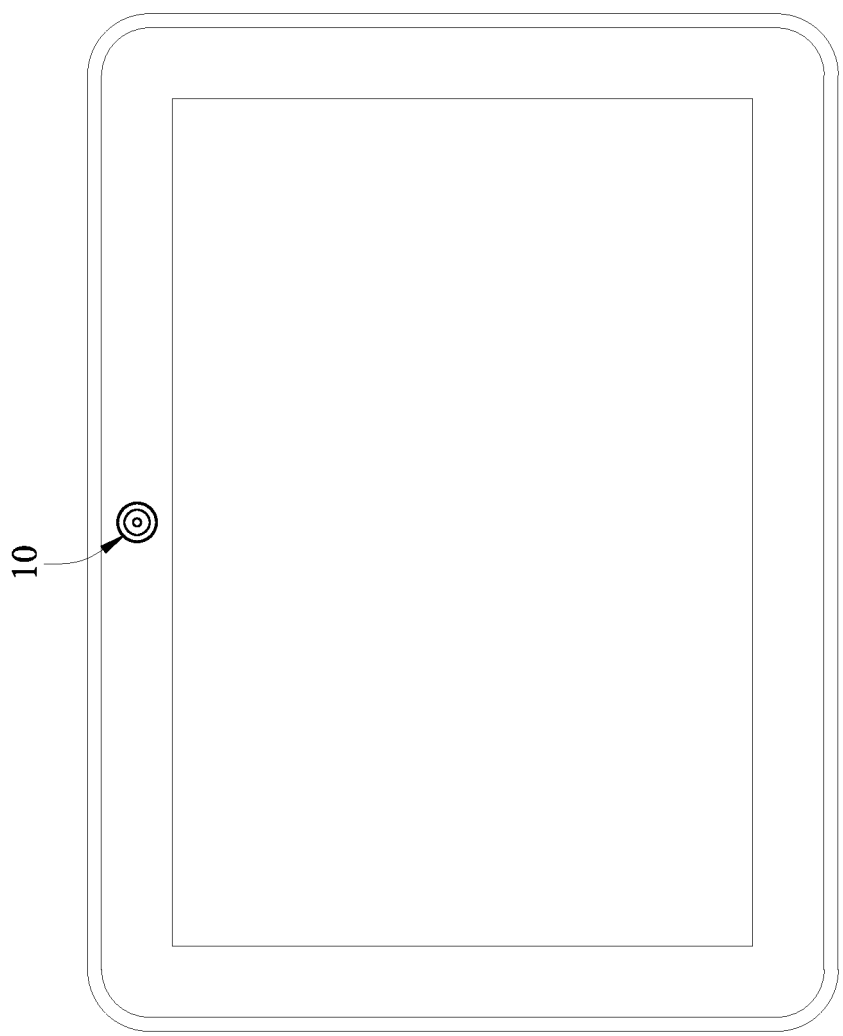
FIG. 17 shows an electronic device according to another embodiment.
Figure 16:
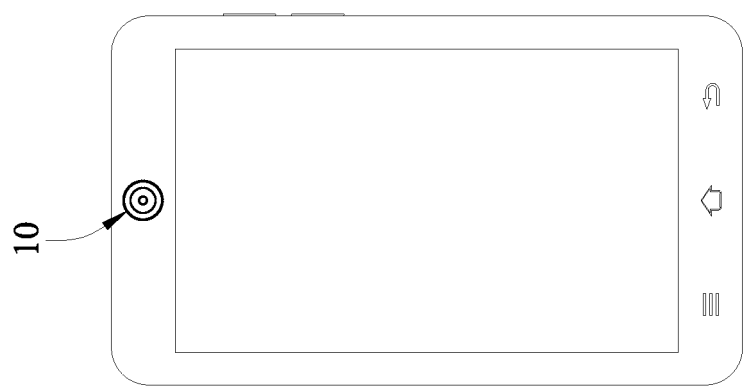
FIG. 16 shows an electronic device according to one embodiment.
Figure 18:
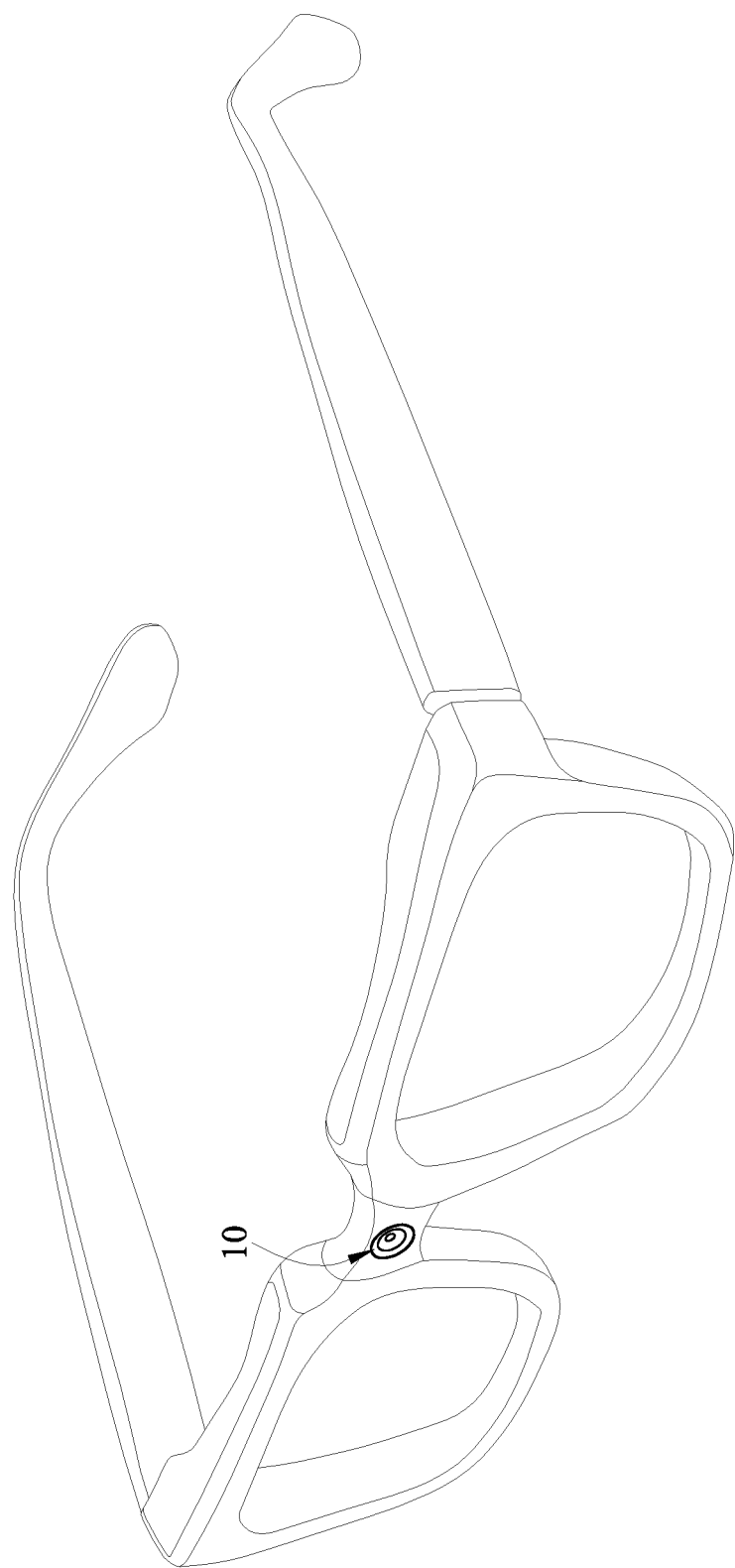
FIG. 18 shows an electronic device according to still another embodiment.

In FIG. 16, FIG. 17, and FIG. 18, an image capturing device 10 may be installed in, but not limited to, an electronic device, including a smart phone (FIG. 16), a tablet personal computer (FIG. 17) or a wearable device (FIG. 18). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the photographing optical lens assembly can be optionally applied to optical systems with a movable focus. Furthermore, the photographing optical lens assembly is featured with good capability in the correction of aberration and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
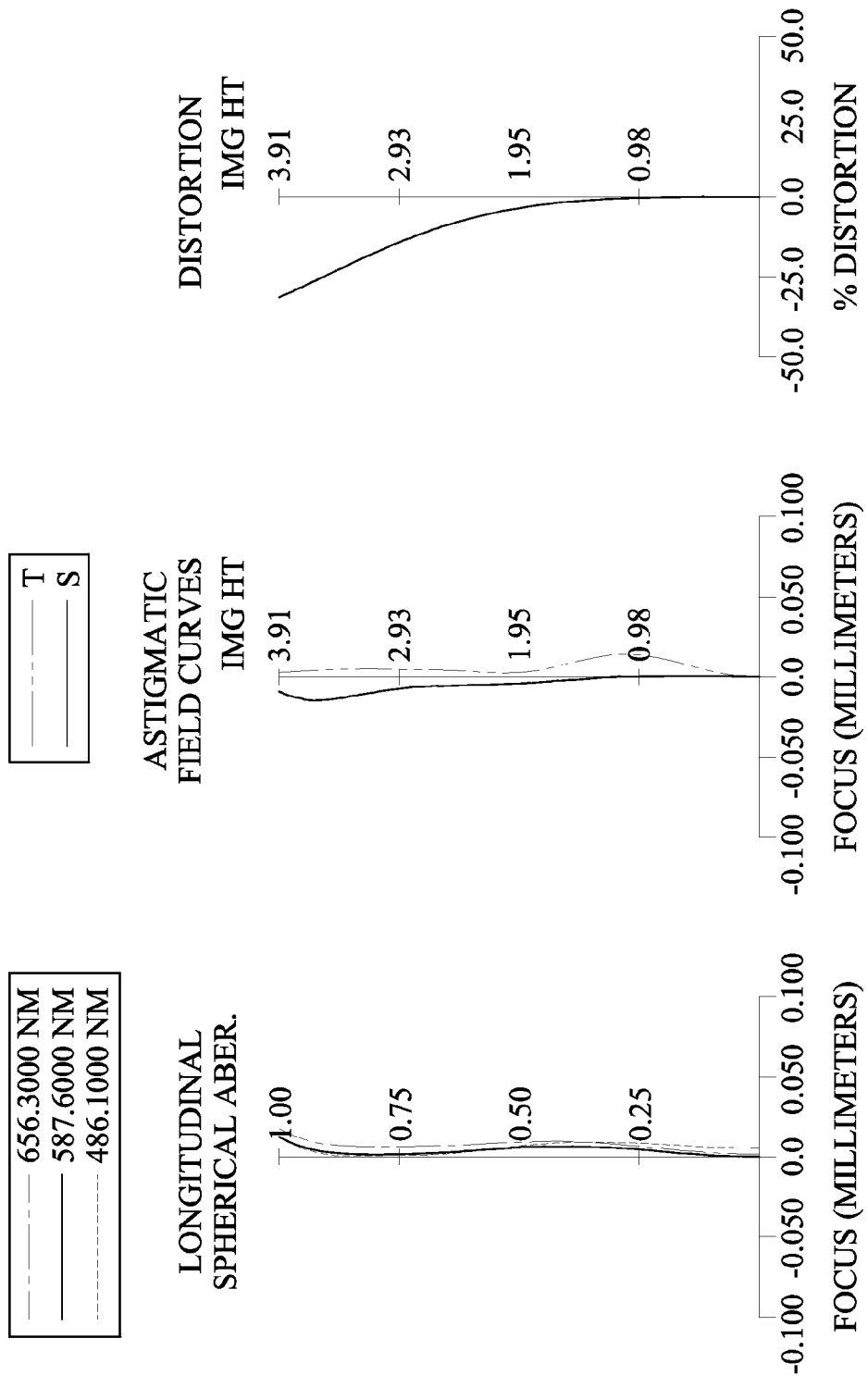
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 190. The photographing optical lens assembly includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180, wherein the photographing optical lens assembly has a total of six single and non-cemented lens elements (110-160).

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has at least one concave shape in an off-axis region thereof.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. Both the object-side surface 151 and the image-side surface 152 of the fifth lens element 150 have at least one inflection point.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one convex shape in an off-axis region thereof.

The IR-cut filter 170 is made of glass and located between the sixth lens element 160 and the image surface 180, and will not affect the focal length of the photographing optical lens assembly. The image sensor 190 is disposed on or near the image surface 180 of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens assembly of the image capturing unit according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=3.68 millimeters (mm); Fno=2.45; and HFOV=57.7 degrees (deg.).

When a maximum chief ray angle of the photographing optical lens assembly is CRA, the following condition is satisfied: CRA=36.1 degrees (deg.).

When an Abbe number of the second lens element 120 is V2, an Abbe number of the fourth lens element 140 is V4, the following condition is satisfied: V2+V4=43.9.

When an axial distance between the first lens element 110 and the second lens element 120 is T12, an axial distance between the fifth lens element 150 and the sixth lens element 160 is T56, the following condition is satisfied: T12/T56=1.33.

When the axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, the axial distance between the fifth lens element 150 and the sixth lens element 160 is T56, the following condition is satisfied: (T12+T56)/(T23+T34+T45)=4.95.

When the axial distance between the first lens element 110 and the second lens element 120 is T12, the axial distance between the fifth lens element 150 and the sixth lens element 160 is T56, an axial distance between the image-side surface 162 of the sixth lens element 160 and the image surface 180 is BL, the following condition is satisfied: (T12+T56)/BL=4.01.

When the axial distance between the first lens element 110 and the second lens element 120 is T12, the axial distance between the fifth lens element 150 and the sixth lens element 160 is T56, an axial distance between the object-side surface 131 of the third lens element 130 and the image-side surface 152 of the fifth lens element 150 is Dr5r10, the following condition is satisfied: (T12+T56)/Dr5r10=1.22.

When a central thickness of the second lens element 120 is CT2, a central thickness of the third lens element 130 is CT3, a sum of central thicknesses of the first lens element 110, the second lens element 120, the third lens element 130, the fourth lens element 140, the fifth lens element 150 and the sixth lens element 160 is ΣCT, the following condition is satisfied: ΣCT/(CT2+CT3)=2.11.

When a distance in parallel with an optical axis from an intersection point of the image-side surface 162 of the sixth lens element 160 and the optical axis to a position of a maximum effective radius of the image-side surface 162 of the sixth lens element 160 is sag62, a central thickness of the sixth lens element 160 is CT6, and the following condition is satisfied: sag62/CT6=−0.60.

When a curvature radius of the object-side surface 161 of the sixth lens element 160 is R11, a curvature radius of the image-side surface 162 of the sixth lens element 160 is R12, the following condition is satisfied: (R11+R12)/(R11−R12)=−0.40.

When the focal length of the photographing optical lens assembly is f, a focal length of the third lens element 130 is f3, a focal length of the fourth lens element 140 is f4, the following condition is satisfied: (f/f3)−(f/f4)=2.17.

When a maximum effective radius of the object-side surface 111 of the first lens element 110 is Sd11, the maximum effective radius of the image-side surface 162 of the sixth lens element 160 is Sd62, the following condition is satisfied: |Sd11/Sd62|=0.96.

The detailed optical data of the 1st embodiment are shown in Table 1 and the aspheric surface data are shown in Table 2 below.

TABLE 1

1st Embodiment
f = 3.68 mm, Fno = 2.45, HFOV = 57.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.201 | (ASP) | 0.601 | Plastic | 1.544 | 55.9 | −7.43 |
| 2 | | 1.668 | (ASP) | 1.944 | | | | |
| 3 | Lens 2 | 96.963 | (ASP) | 1.397 | Plastic | 1.639 | 23.5 | 30.42 |
| 4 | | −24.175 | (ASP) | 0.193 | | | | |
| 5 | Ape. Stop | Plano | | −0.075 | | | | |
| 6 | Lens 3 | 2638 | (ASP) | 0.996 | Plastic | 1.544 | 55.9 | 2.72 |
| 7 | | −2.933 | (ASP) | 0.100 | | | | |
| 8 | Lens 4 | −48.665 | (ASP) | 0.330 | Plastic | 1.661 | 20.4 | −4.51 |
| 9 | | 3.180 | (ASP) | 0.469 | | | | |
| 10 | Lens 5 | 11.538 | (ASP) | 0.889 | Plastic | 1.544 | 55.9 | 4.96 |
| 11 | | −3.429 | (ASP) | 1.460 | | | | |
| 12 | Lens 6 | −3.333 | (ASP) | 0.846 | Plastic | 1.544 | 55.9 | −4.17 |
| 13 | | 7.725 | (ASP) | 0.300 | | | | |
| 14 | IR-cut filter | Plano | | 0.100 | Glass | 1.517 | 64.2 | — |
| 15 | | Plano | | 0.449 | | | | |
| 16 | Image | Plano | | — | | | | |

Note:
Reference wavelength is 587.6 nm (d-line).

TABLE 2

Aspheric Coefficients

| Surface # | 1 | 2 | 3 | 4 | 6 | 7 |
|---|---|---|---|---|---|---|
| k = | −4.9284E−01 | −6.9753E−01 | −9.0000E+01 | 9.0000E+01 | 2.8540E−01 | −3.5058E−01 |
| A4 = | −3.9390E−03 | 6.9592E−03 | −1.3362E−02 | −3.3437E−02 | −2.6071E−02 | 1.1067E−02 |
| A6 = | −8.8080E−04 | −1.5499E−03 | −1.6412E−03 | 1.9504E−02 | 2.3630E−02 | −1.1099E−02 |
| A8 = | 7.2168E−05 | 3.0412E−04 | −1.0692E−03 | −9.9880E−03 | −1.9884E−02 | 3.7756E−03 |
| A10 = | −1.2033E−06 | 3.5387E−05 | 3.2315E−04 | 3.9814E−03 | 1.0192E−02 | −3.7285E−03 |
| A12 = | — | −2.9359E−05 | −4.8561E−06 | −8.3979E−05 | −1.5695E−03 | 2.6720E−03 |

| Surface # | 8 | 9 | 10 | 11 | 12 | 13 |
|---|---|---|---|---|---|---|
| k = | 9.0000E+01 | −1.8364E+01 | −8.4057E+01 | 1.2283E+00 | 3.0085E−01 | −5.7470E+01 |
| A4 = | −9.2139E−02 | −3.0544E−02 | −1.6325E−02 | 2.0622E−03 | −2.5426E−02 | −6.2221E−04 |
| A6 = | 7.2728E−02 | 4.4034E−02 | −4.1712E−03 | −4.5963E−03 | −2.5832E−03 | −5.1620E−03 |
| A8 = | −5.2334E−02 | −2.6475E−02 | 3.7349E−03 | −1.7036E−04 | 1.7555E−03 | 1.6226E−03 |
| A10 = | 1.9890E−02 | 1.1196E−02 | −2.9331E−03 | 1.1811E−03 | −2.8445E−04 | −2.9402E−04 |
| A12 = | −2.1286E−03 | −2.8263E−03 | 1.1275E−03 | −6.1696E−04 | 5.5440E−05 | 3.1250E−05 |

TABLE 2-continued

| Aspheric Coefficients | | | | | |
|---|---|---|---|---|---|
| A14 = | −2.2076E−04 | 3.1087E−04 | −1.4390E−04 | 1.2289E−04 | −5.1475E−06 | −1.7988E−06 |
| A16 = | — | — | — | — | 1.0103E−07 | 4.3494E−08 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
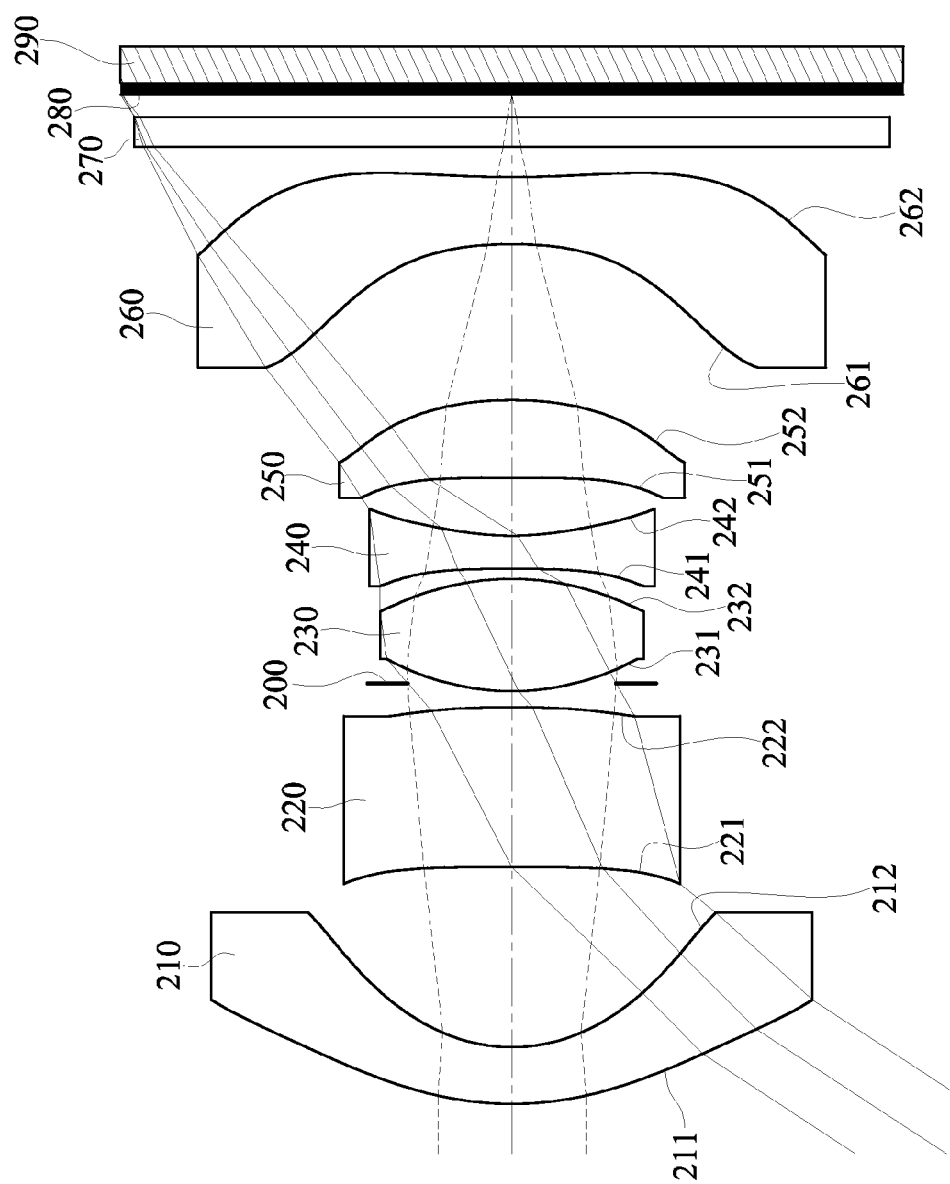
FIG. 3 is a schematic view of an image capturing unit according to the 2nd embodiment of the present disclosure.
Figure 4:
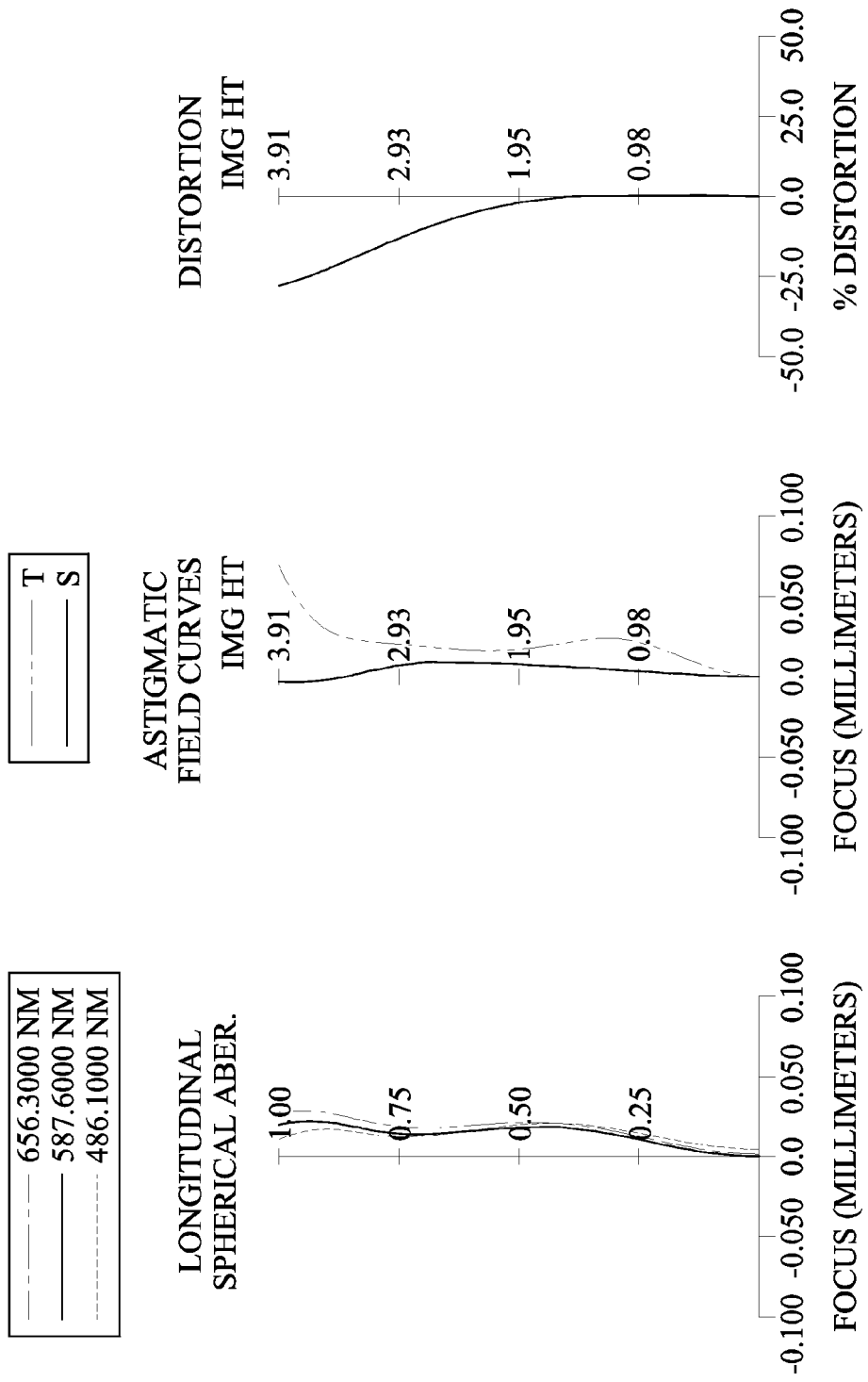
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 290. The photographing optical lens assembly includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280, wherein the photographing optical lens assembly has a total of six single and non-cemented lens elements (210-260).

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has at least one concave shape in an off-axis region thereof.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has at least one inflection point.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one convex shape in an off-axis region thereof.

The IR-cut filter 270 is made of glass and located between the sixth lens element 260 and the image surface 280, and will not affect the focal length of the photographing optical lens assembly. The image sensor 290 is disposed on or near the image surface 280 of the photographing optical lens assembly.

The detailed optical data of the 2nd embodiment are shown in Table 3 and the aspheric surface data are shown in Table 4 below.

TABLE 3

2nd Embodiment
f = 3.62 mm, Fno = 2.45, HFOV = 56.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.246 | (ASP) | 0.567 | Plastic | 1.544 | 55.9 | −7.30 |
| 2 | | 1.677 | (ASP) | 1.799 | | | | |
| 3 | Lens 2 | −68.154 | (ASP) | 1.597 | Plastic | 1.583 | 30.2 | 23.81 |
| 4 | | −11.640 | (ASP) | 0.240 | | | | |
| 5 | Ape. Stop | Plano | | −0.080 | | | | |
| 6 | Lens 3 | 2.473 | (ASP) | 1.122 | Plastic | 1.544 | 55.9 | 2.51 |
| 7 | | −2.571 | (ASP) | 0.100 | | | | |
| 8 | Lens 4 | −58.401 | (ASP) | 0.330 | Plastic | 1.650 | 21.5 | −3.95 |
| 9 | | 2.695 | (ASP) | 0.579 | | | | |
| 10 | Lens 5 | −319.241 | (ASP) | 0.777 | Plastic | 1.544 | 55.9 | 6.38 |

TABLE 3-continued

2nd Embodiment
f = 3.62 mm, Fno = 2.45, HFOV = 56.7 deg.

| Surface # | | Curvature Radius | | Thickness | Material | Index | Abbe # | Focal Length |
|---|---|---|---|---|---|---|---|---|
| 11 | | −3.438 | (ASP) | 1.558 | | | | |
| 12 | Lens 6 | −3.862 | (ASP) | 0.669 | Plastic | 1.544 | 55.9 | −5.05 |
| 13 | | 10.122 | (ASP) | 0.300 | | | | |
| 14 | IR-cut filter | Plano | | 0.300 | Glass | 1.517 | 64.2 | — |
| 15 | | Plano | | 0.221 | | | | |
| 16 | Image | Plano | | — | | | | |

Note:
Reference wavelength is 587.6 nm (d-line).

TABLE 4

Aspheric Coefficients

| Surface # | 1 | 2 | 3 | 4 | 6 | 7 |
|---|---|---|---|---|---|---|
| k = | −3.9868E−01 | −7.2384E−01 | −9.0000E+01 | 2.0791E+01 | 7.2192E−01 | −1.2876E+00 |
| A4 = | −4.7160E−03 | 6.7133E−03 | −1.2107E−02 | −2.8918E−02 | −2.8353E−02 | 1.1063E−02 |
| A6 = | −8.1923E−04 | −1.4476E−03 | −1.2810E−03 | 2.1244E−02 | 2.3906E−02 | −3.4316E−03 |
| A8 = | 6.0939E−05 | 3.8594E−04 | −1.1348E−03 | −1.1450E−02 | −2.0657E−02 | −7.7383E−03 |
| A10 = | −2.0489E−07 | −2.3776E−05 | 2.9488E−04 | 4.1880E−03 | 8.9468E−03 | 2.1084E−03 |
| A12 = | — | −2.9359E−05 | −4.8561E−06 | −8.3979E−05 | −1.4562E−03 | 9.6965E−04 |

| Surface # | 8 | 9 | 10 | 11 | 12 | 13 |
|---|---|---|---|---|---|---|
| k = | 9.0000E+01 | −1.4010E+01 | −8.4057E+01 | 2.5307E+00 | 1.4788E−01 | −5.7470E+01 |
| A4 = | −1.1093E−01 | −3.4658E−01 | −4.1435E−02 | −1.5288E−02 | −4.2799E−02 | −4.2569E−03 |
| A6 = | 1.1344E−01 | 6.4304E−02 | 7.0107E−03 | 6.1363E−03 | 1.7375E−03 | −6.2110E−03 |
| A8 = | −1.0493E−01 | −4.9486E−02 | −4.9066E−03 | −8.7534E−03 | 1.6651E−03 | 2.3802E−03 |
| A10 = | 5.0264E−02 | 2.2461E−02 | 2.2227E−04 | 6.6392E−03 | −3.9255E−04 | −5.0751E−04 |
| A12 = | −1.1612E−02 | −5.4251E−03 | 6.2619E−04 | −2.5811E−03 | 7.1943E−05 | 6.1666E−05 |
| A14 = | 1.2745E−03 | 5.7687E−04 | −1.0882E−04 | 4.4902E−04 | −7.6796E−06 | −4.0024E−06 |
| A16 = | — | — | — | — | 3.0704E−07 | 1.0864E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.62 | (T12 + T56)/BL | 4.09 |
| Fno | 2.45 | (T12 + T56)/Dr5r10 | 1.15 |
| HFOV [deg.] | 56.7 | ΣCT/(CT2 + CT3) | 1.86 |
| CRA [deg.] | 33.0 | sag62/CT6 | −1.17 |
| V2 + V4 | 51.7 | (R11 + R12)/(R11 − R12) | −0.45 |
| T12/T56 | 1.15 | (f/f3) − (f/f4) | 2.36 |
| (T12 + T56)/(T23 + T34 + T45) | 4.00 | |Sd11/Sd62| | 0.96 |

3rd Embodiment

Figure 5:
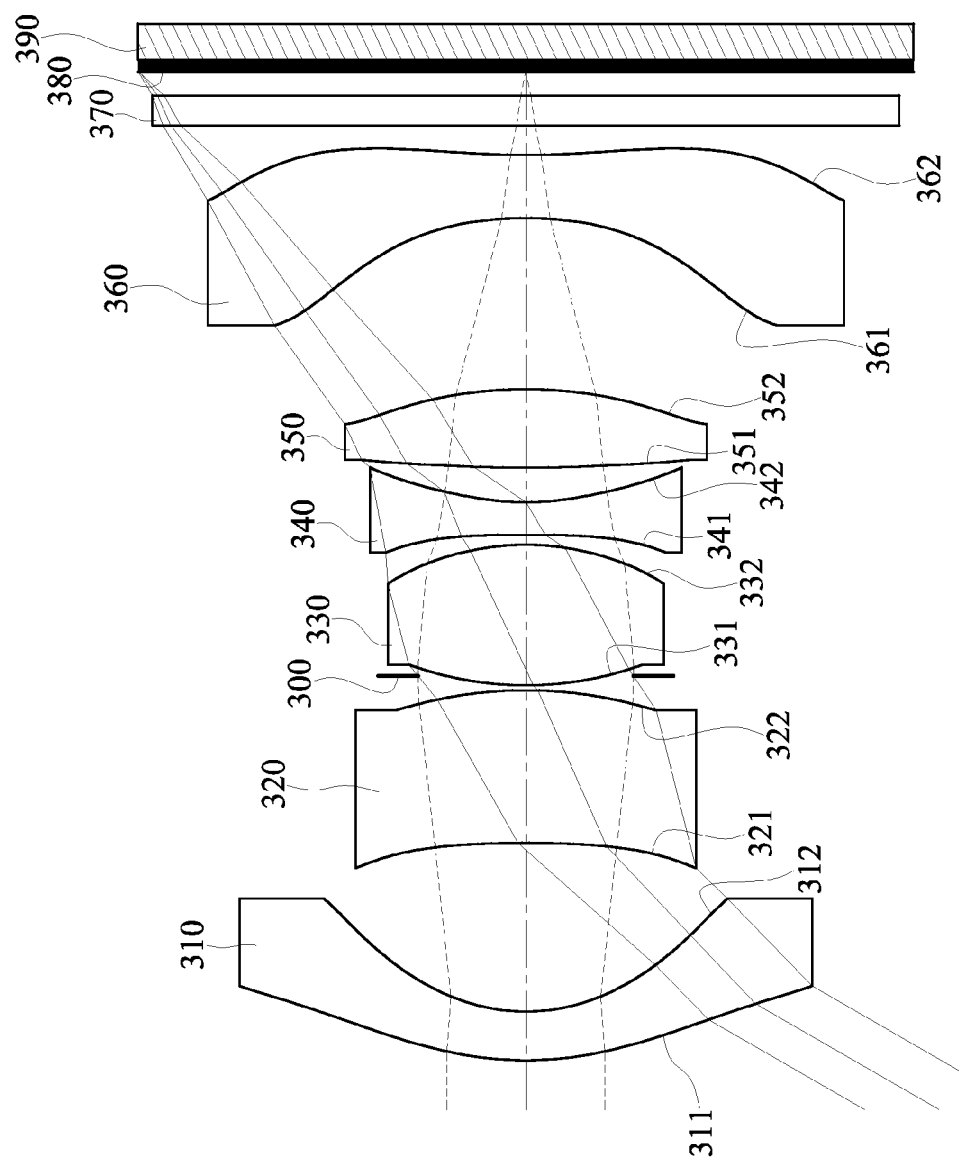
FIG. 5 is a schematic view of an image capturing unit according to the 3rd embodiment of the present disclosure.
Figure 6:
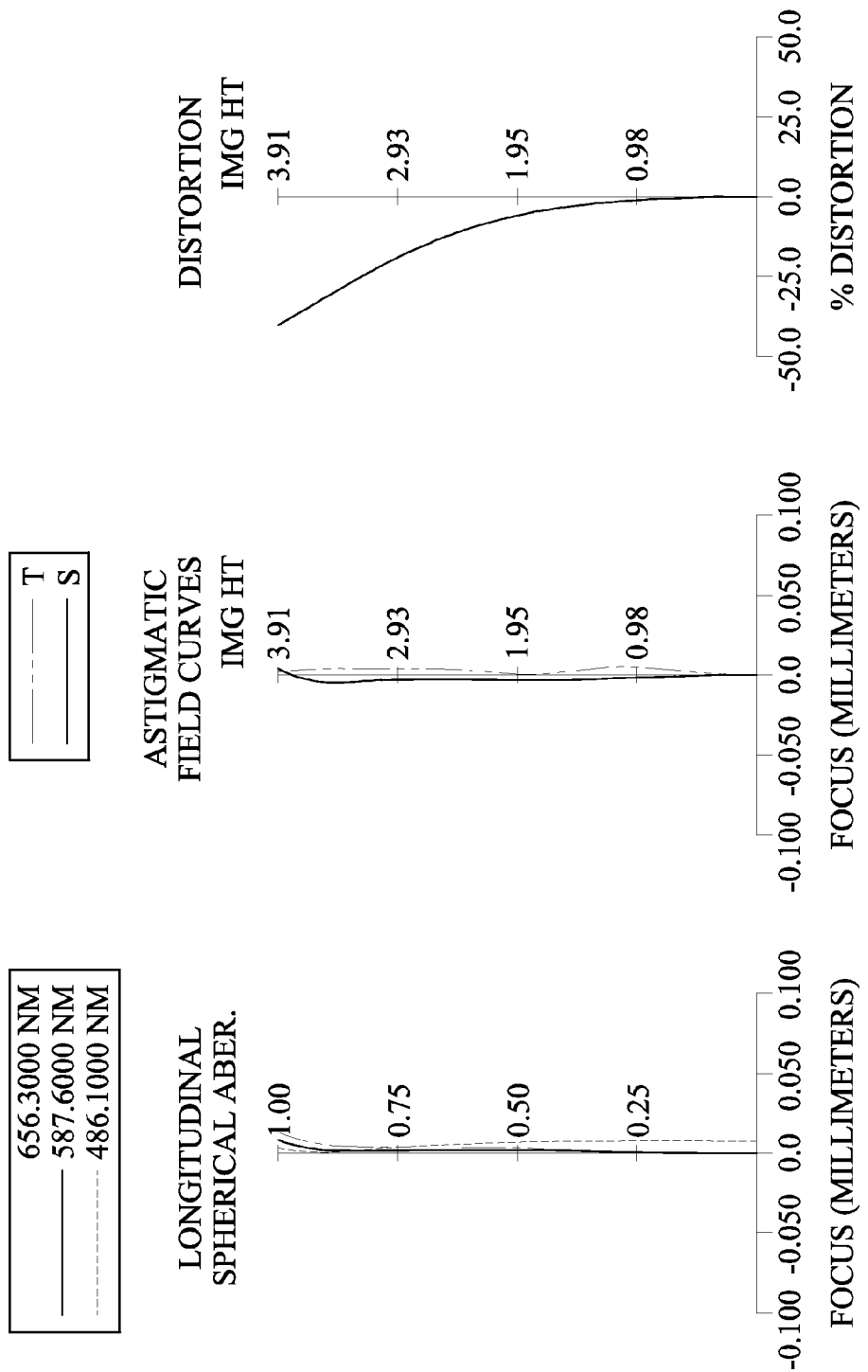
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, a first lens element 310, a second lens element 320, an aperture stop 300, a third lens element 330, a fourth lens element 340, a fifth lens element 350, a sixth lens element 360, an IR-cut filter 370 and an image surface 380, wherein the photographing optical lens assembly has a total of six single and non-cemented lens elements (310-360).

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has at least one concave shape in an off-axis region thereof.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric. The image-side surface 352 of the fifth lens element 350 has at least one inflection point.

The sixth lens element 360 with negative refractive power has an object-side surface 361 being concave in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one convex shape in an off-axis region thereof.

The IR-cut filter 370 is made of glass and located between the sixth lens element 360 and the image surface 380, and will not affect the focal length of the photographing optical lens assembly. The image sensor 390 is disposed on or near the image surface 380 of the photographing optical lens assembly.

In this embodiment, an axial distance T23 between the second lens element 320 and the third lens element 330, where the aperture stop 300 is located, is the shortest among all axial distances T12, T23, T34, T45 and T56 between every two of the first lens element 310, the second lens element 320, the third lens element 330, the fourth lens element 340, the fifth lens element 350 and the sixth lens element 360 that are adjacent to each other.

The detailed optical data of the 3rd embodiment are shown in Table 5 and the aspheric surface data are shown in Table 6 below.

TABLE 5

3rd Embodiment
f = 3.90 mm, Fno = 2.44, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.464 | (ASP) | 0.493 | Plastic | 1.544 | 55.9 | −8.71 |
| 2 | | 1.901 | (ASP) | 1.706 | | | | |
| 3 | Lens 2 | −11.414 | (ASP) | 1.544 | Plastic | 1.535 | 55.7 | 12.03 |
| 4 | | −4.309 | (ASP) | 0.144 | | | | |
| 5 | Ape. Stop | Plano | | −0.094 | | | | |
| 6 | Lens 3 | 3.413 | (ASP) | 1.422 | Plastic | 1.535 | 55.7 | 2.98 |
| 7 | | −2.554 | (ASP) | 0.100 | | | | |
| 8 | Lens 4 | −25.984 | (ASP) | 0.330 | Plastic | 1.639 | 23.5 | −3.68 |
| 9 | | 2.600 | (ASP) | 0.349 | | | | |
| 10 | Lens 5 | 12.117 | (ASP) | 0.794 | Plastic | 1.544 | 55.9 | 6.00 |
| 11 | | −4.362 | (ASP) | 1.730 | | | | |
| 12 | Lens 6 | −3.854 | (ASP) | 0.639 | Plastic | 1.544 | 55.9 | −4.71 |
| 13 | | 8.115 | (ASP) | 0.300 | | | | |
| 14 | IR-cut filter | Plano | | 0.300 | Glass | 1.517 | 64.2 | — |
| 15 | | Plano | | 0.242 | | | | |
| 16 | Image | Plano | | — | | | | |

Note:
Reference wavelength is 587.6 nm (d-line).

TABLE 6

Aspheric Coefficients

| Surface # | 1 | 2 | 3 | 4 | 6 | 7 |
|---|---|---|---|---|---|---|
| k = | −7.6000E−01 | −7.6013E−01 | −7.4048E+01 | −7.4648E+00 | 1.9830E+00 | −2.6676E−01 |
| A4 = | −5.9821E−03 | 3.1683E−03 | −1.8070E−02 | −1.5761E−02 | −7.4581E−03 | 2.6862E−02 |
| A6 = | −7.8636E−04 | −7.2182E−04 | 1.1318E−03 | 4.1289E−03 | 1.8608E−03 | −2.6026E−02 |
| A8 = | 9.1469E−05 | −1.0439E−05 | −1.1745E−03 | −5.0335E−04 | −4.8171E−03 | 1.2644E−02 |
| A10 = | −1.9732E−06 | 9.6787E−05 | 3.0767E−04 | 1.7302E−04 | 2.8924E−03 | −3.8804E−03 |
| A12 = | — | −3.1044E−05 | −1.4062E−05 | 9.0843E−05 | −9.1730E−04 | 4.7483E−04 |

| Surface # | 8 | 9 | 10 | 11 | 12 | 13 |
|---|---|---|---|---|---|---|
| k = | −7.1058E+01 | −1.3710E+01 | −2.9218E+01 | 1.8561E+00 | 3.0014E−01 | −5.7462E+01 |
| A4 = | −6.3062E−02 | 2.0877E−03 | −1.0120E−02 | 3.3766E−03 | −2.0155E−02 | −3.3944E−03 |
| A6 = | 4.4689E−02 | 1.1185E−02 | 2.9431E−03 | −3.6740E−03 | −1.7001E−03 | −3.5283E−03 |
| A8 = | −3.7160E−02 | −6.5974E−03 | −1.3919E−03 | 2.9088E−03 | 2.5197E−03 | 1.2354E−03 |
| A10 = | 1.9139E−02 | 2.2347E−03 | 1.0839E−03 | −1.4387E−03 | −8.0035E−04 | −2.3950E−04 |
| A12 = | −5.7209E−03 | −4.3328E−04 | −2.7080E−04 | 5.0653E−04 | 1.5137E−04 | 2.6069E−05 |
| A14 = | 7.8196E−04 | 4.4802E−05 | 1.6499E−05 | −5.9141E−05 | −1.4345E−05 | −1.4947E−06 |
| A16 = | — | — | — | — | 5.1916E−07 | 3.6019E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.90 | (T12 + T56)/BL | 4.08 |
| Fno | 2.44 | (T12 + T56)/Dr5r10 | 1.15 |
| HFOV [deg.] | 60.0 | ΣCT/(CT2 + CT3) | 1.76 |
| CRA [deg.] | 37.6 | sag62/CT6 | −0.72 |
| V2 + V4 | 79.2 | (R11 + R12)/(R11 − R12) | −0.36 |
| T12/T56 | 0.99 | (f/f3) − (f/f4) | 2.37 |
| (T12 + T56)/(T23 + T34 + T45) | 6.89 | |Sd11/Sd62| | 0.85 |

4th Embodiment

Figure 7:
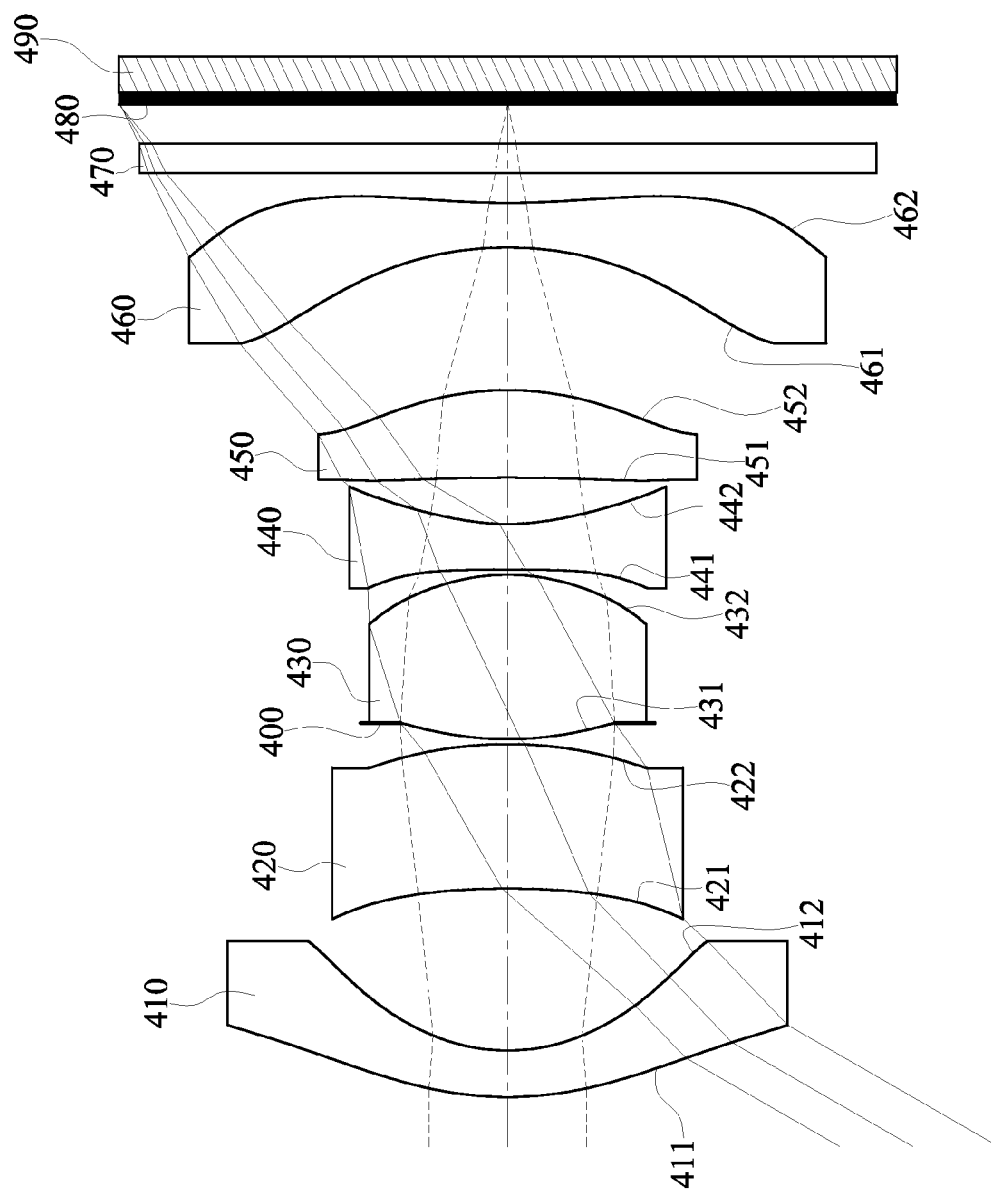
FIG. 7 is a schematic view of an image capturing unit according to the 4th embodiment of the present disclosure.
Figure 8:
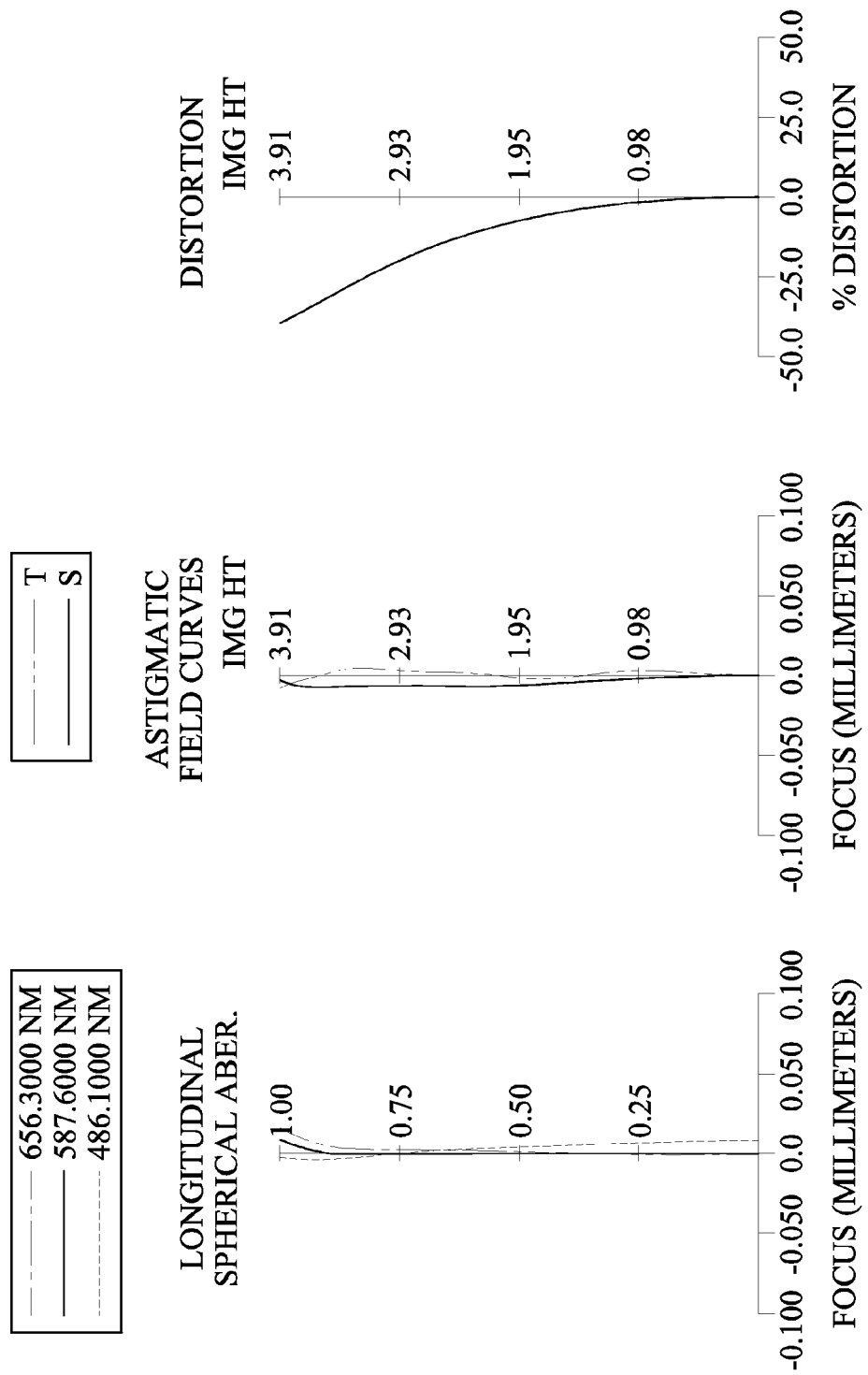
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 490. The photographing optical lens assembly includes, in order from an object side to an image side, a first lens element 410, a second lens element 420, an aperture stop 400, a third lens element 430, a fourth lens element 440, a fifth lens element 450, a sixth lens element 460, an IR-cut filter 470 and an image surface 480, wherein the photographing optical lens assembly has a total of six single and non-cemented lens elements (410-460).

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has at least one concave shape in an off-axis region thereof.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. Both the object-side surface 451 and the image-side surface 452 of the fifth lens element 450 have at least one inflection point.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one convex shape in an off-axis region thereof.

The IR-cut filter 470 is made of glass and located between the sixth lens element 460 and the image surface 480, and will not affect the focal length of the photographing optical lens assembly. The image sensor 490 is disposed on or near the image surface 480 of the photographing optical lens assembly.

In this embodiment, an axial distance T23 between the second lens element 420 and the third lens element 430, where the aperture stop 400 is located, is the shortest among all axial distances T12, T23, T34, T45 and T56 between every two of the first lens element 410, the second lens element 420, the third lens element 430, the fourth lens element 440, the fifth lens element 450 and the sixth lens element 460 that are adjacent to each other.

The detailed optical data of the 4th embodiment are shown in Table 7 and the aspheric surface data are shown in Table 8 below.

TABLE 7

4th Embodiment
f = 3.86 mm, Fno = 2.44, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.467 | (ASP) | 0.469 | Plastic | 1.544 | 55.9 | −8.68 |
| 2 | | 1.904 | (ASP) | 1.631 | | | | |
| 3 | Lens 2 | −7.850 | (ASP) | 1.455 | Plastic | 1.535 | 55.7 | 15.47 |
| 4 | | −4.289 | (ASP) | 0.211 | | | | |
| 5 | Ape. Stop | Plano | | −0.161 | | | | |
| 6 | Lens 3 | 3.337 | (ASP) | 1.658 | Plastic | 1.535 | 55.7 | 2.64 |
| 7 | | −2.025 | (ASP) | 0.050 | | | | |
| 8 | Lens 4 | −49.206 | (ASP) | 0.460 | Plastic | 1.639 | 23.5 | −3.47 |
| 9 | | 2.330 | (ASP) | 0.468 | | | | |

TABLE 7-continued

4th Embodiment
f = 3.86 mm, Fno = 2.44, HFOV = 60.0 deg.

| Surface # | | Curvature Radius | | Thickness | Material | Index | Abbe # | Focal Length |
|---|---|---|---|---|---|---|---|---|
| 10 | Lens 5 | −21.809 | (ASP) | 0.881 | Plastic | 1.544 | 55.9 | 6.17 |
| 11 | | −2.950 | (ASP) | 1.436 | | | | |
| 12 | Lens 6 | −3.588 | (ASP) | 0.450 | Plastic | 1.544 | 55.9 | −4.44 |
| 13 | | 7.718 | (ASP) | 0.300 | | | | |
| 14 | IR-cut filter | Plano | | 0.300 | Glass | 1.517 | 64.2 | — |
| 15 | | Plano | | 0.391 | | | | |
| 16 | Image | Plano | | — | — | | | |

Note:
Reference wavelength is 587.6 nm (d-line).

TABLE 8

Aspheric Coefficients

| Surface # | 1 | 2 | 3 | 4 | 6 | 7 |
|---|---|---|---|---|---|---|
| k = | −7.6000E−01 | −7.5543E−01 | −7.4048E+01 | −5.8072E+00 | 1.0322E+00 | −4.3223E−01 |
| A4 = | −5.9821E−03 | 3.7421E−03 | −2.5007E−02 | −1.3146E−02 | −9.0744E−03 | 5.1871E−02 |
| A6 = | −7.8636E−04 | −1.5065E−04 | 6.4738E−03 | 4.1478E−04 | −1.6976E−03 | −5.2611E−02 |
| A8 = | 9.1469E−05 | −3.2880E−04 | −3.0693E−03 | 1.0059E−03 | −4.7807E−03 | 2.8539E−02 |
| A10 = | −1.9732E−06 | 2.0100E−04 | 6.5986E−04 | −2.9559E−04 | 3.3713E−03 | −9.8597E−03 |
| A12 = | — | −5.1136E−05 | −4.2494E−05 | 9.1128E−05 | −1.6924E−03 | 1.3200E−03 |

| Surface # | 8 | 9 | 10 | 11 | 12 | 13 |
|---|---|---|---|---|---|---|
| k = | −7.1058E+01 | −1.1542E+01 | 5.4872E+01 | 9.9916E−02 | −2.1374E−02 | −5.7462E+01 |
| A4 = | −5.4942E−02 | 6.8080E−03 | −4.9272E−03 | 9.7236E−03 | −7.0814E−03 | −5.9767E−03 |
| A6 = | 2.6904E−02 | 5.5222E−03 | 7.8068E−03 | −2.1689E−03 | 2.6686E−04 | −2.0385E−03 |
| A8 = | −3.4342E−02 | −7.1324E−03 | −2.7051E−03 | 3.3493E−03 | 9.8391E−04 | 8.9426E−04 |
| A10 = | 2.4995E−02 | 4.4178E−03 | 7.5006E−04 | −1.5890E−03 | −3.3637E−04 | −1.9474E−04 |
| A12 = | −9.6867E−03 | −1.3392E−03 | −4.3020E−05 | 4.8604E−04 | 5.7637E−05 | 2.2627E−05 |
| A14 = | 1.5913E−03 | 1.6767E−04 | −1.9097E−05 | −5.4760E−05 | −4.6995E−06 | −1.3887E−06 |
| A16 = | — | — | — | — | 1.4539E−07 | 3.6075E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.86 | (T12 + T56)/BL | 3.10 |
| Fno | 2.44 | (T12 + T56)/Dr5r10 | 0.87 |
| HFOV [deg.] | 60.0 | ΣCT/(CT2 + CT3) | 1.73 |
| CRA [deg.] | 32.4 | sag62/CT6 | −1.22 |
| V2 + V4 | 79.2 | (R11 + R12)/(R11 − R12) | −0.37 |
| T12/T56 | 1.14 | (f/f3) − (f/f4) | 2.57 |
| (T12 + T56)/(T23 + T34 + T45) | 5.40 | \|Sd11/Sd62\| | 0.85 |

5th Embodiment

Figure 9:
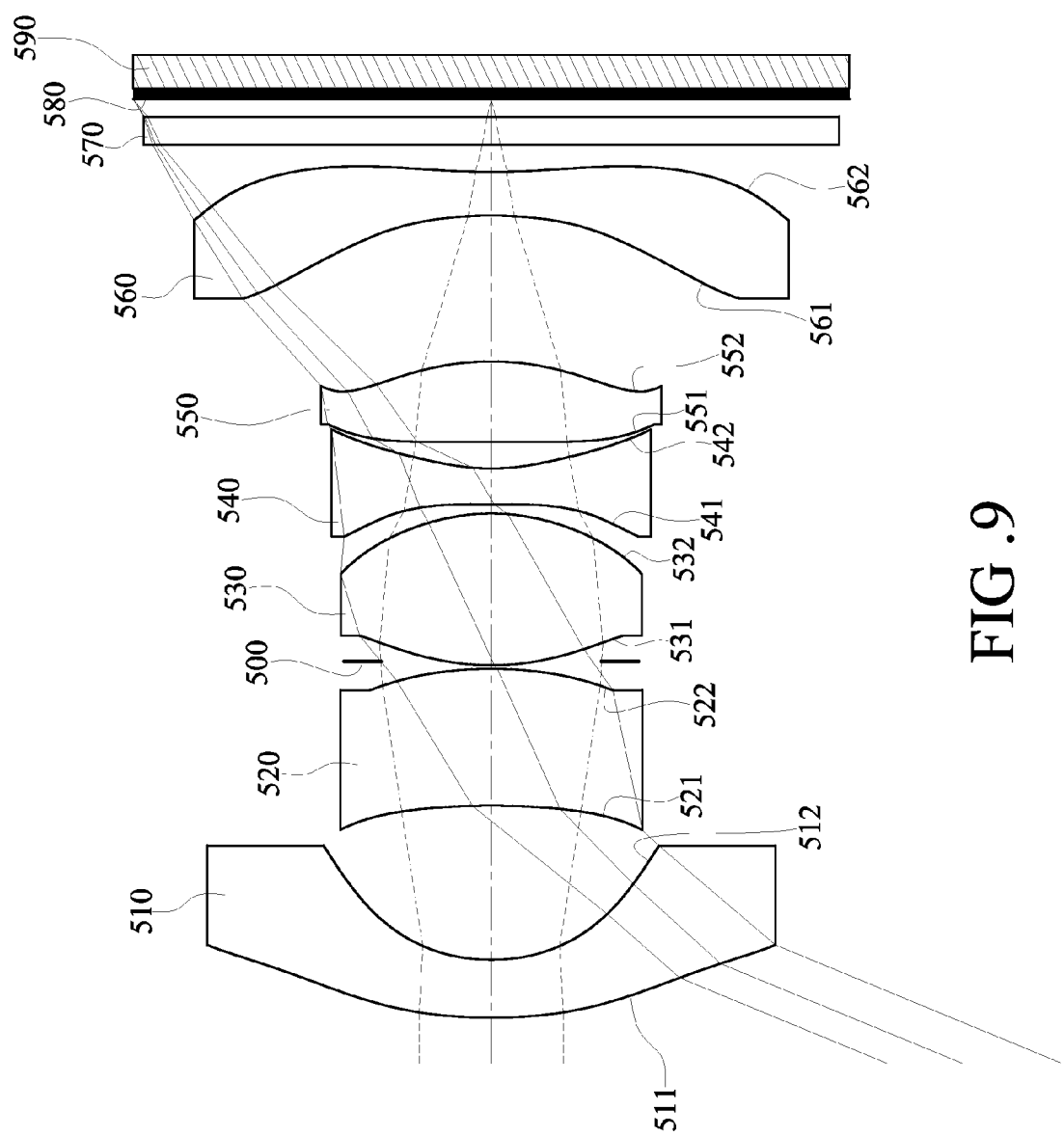
FIG. 9 is a schematic view of an image capturing unit according to the 5th embodiment of the present disclosure.
Figure 10:
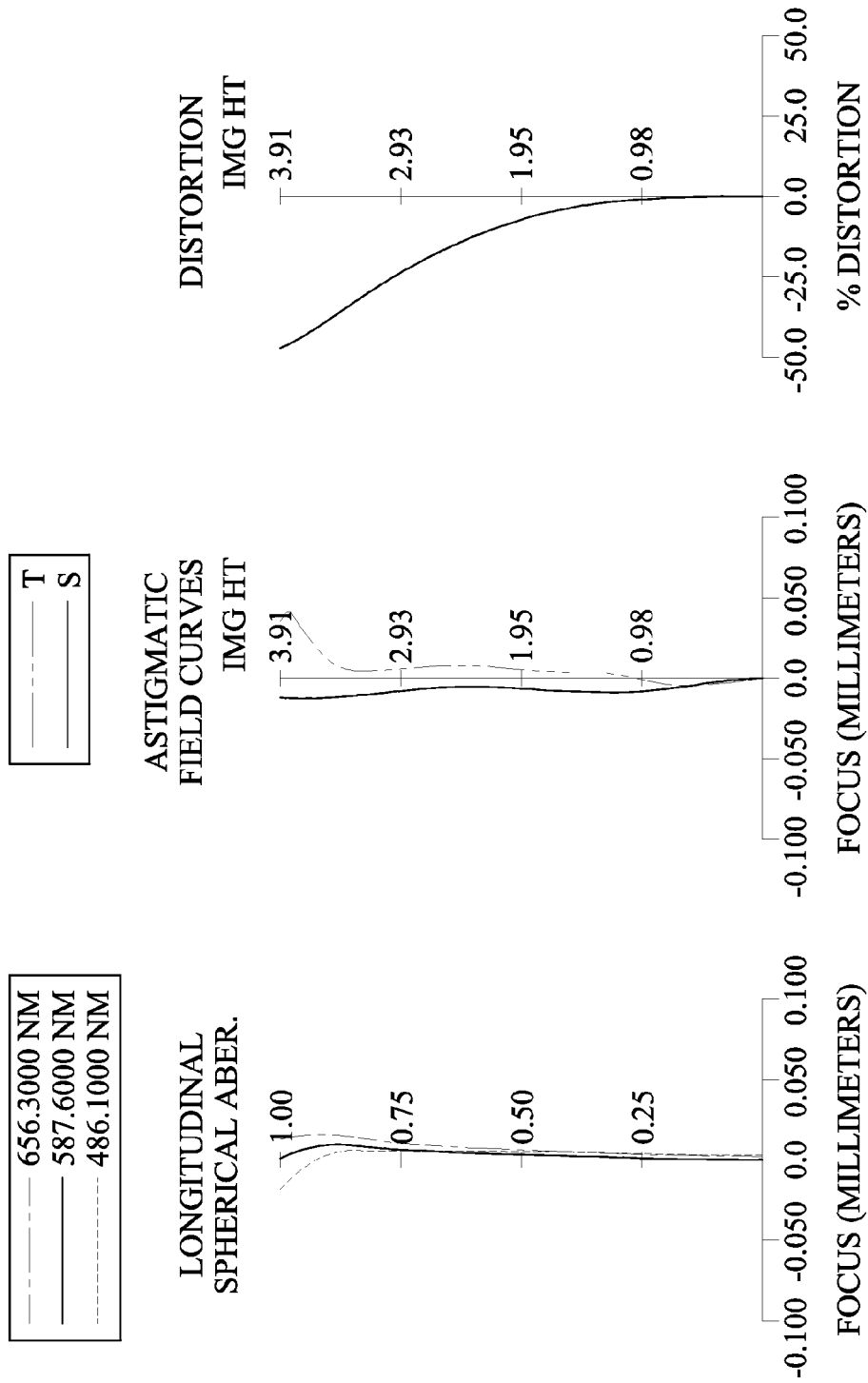
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 590. The photographing optical lens assembly includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image surface 580, wherein the photographing optical lens assembly has a total of six single and non-cemented lens elements (510-560).

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has at least one concave shape in an off-axis region thereof.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. Both the object-side surface 551 and the image-side surface 552 of the fifth lens element 550 have at least one inflection point.

The sixth lens element 560 with negative refractive power has an object-side surface 561 being concave in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one convex shape in an off-axis region thereof.

The IR-cut filter 570 is made of glass and located between the sixth lens element 560 and the image surface 580, and will not affect the focal length of the photographing optical lens assembly. The image sensor 590 is disposed on or near the image surface 580 of the photographing optical lens assembly.

In this embodiment, an axial distance T23 between the second lens element 520 and the third lens element 530, where the aperture stop 500 is located, is the shortest among all axial distances T12, T23, T34, T45 and T56 between every two of the first lens element 510, the second lens element 520, the third lens element 530, the fourth lens element 540, the fifth lens element 550 and the sixth lens element 560 that are adjacent to each other.

The detailed optical data of the 5th embodiment are shown in Table 9 and the aspheric surface data are shown in Table 10 below.

TABLE 9

5th Embodiment
f = 3.21 mm, Fno = 2.04, HFOV = 67.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.836 | (ASP) | 0.633 | Plastic | 1.544 | 55.9 | −6.25 |
| 2 | | 2.066 | (ASP) | 1.682 | | | | |
| 3 | Lens 2 | −8.072 | (ASP) | 1.495 | Plastic | 1.544 | 55.9 | 15.62 |
| 4 | | −4.411 | (ASP) | 0.080 | | | | |
| 5 | Ape. Stop | Plano | | −0.040 | | | | |
| 6 | Lens 3 | 2.826 | (ASP) | 1.657 | Plastic | 1.544 | 55.9 | 2.59 |
| 7 | | −2.233 | (ASP) | 0.100 | | | | |
| 8 | Lens 4 | −100.000 | (ASP) | 0.391 | Plastic | 1.639 | 23.5 | −3.29 |
| 9 | | 2.151 | (ASP) | 0.293 | | | | |
| 10 | Lens 5 | −100.000 | (ASP) | 0.877 | Plastic | 1.544 | 55.9 | 5.45 |
| 11 | | −2.888 | (ASP) | 1.593 | | | | |
| 12 | Lens 6 | −4.911 | (ASP) | 0.478 | Plastic | 1.544 | 55.9 | −5.44 |
| 13 | | 7.715 | (ASP) | 0.300 | | | | |
| 14 | IR-cut filter | Plano | | 0.300 | Glass | 1.517 | 64.2 | — |
| 15 | | Plano | | 0.191 | | | | |
| 16 | Image | Plano | | — | | | | |

Note:
Reference wavelength is 587.6 nm (d-line).
An effective radius of the image-side surface of the first lens element (Surface 2) is 1.830 mm.

TABLE 10

Aspheric Coefficients

| Surface # | 1 | 2 | 3 | 4 | 6 | 7 |
|---|---|---|---|---|---|---|
| k = | 7.2993E−01 | −4.4819E−01 | −7.0859E+01 | −2.7583E+00 | 6.8286E−01 | −5.1436E−01 |
| A4 = | 1.4746E−02 | 3.6077E−02 | −1.7092E−02 | −1.6435E−02 | −1.5535E−02 | 2.4733E−02 |
| A6 = | −4.0198E−03 | 3.0588E−03 | 2.3448E−03 | 1.2475E−03 | 2.9194E−03 | −1.5489E−02 |
| A8 = | 3.2170E−04 | −4.3961E−03 | −1.8404E−03 | −3.5526E−04 | −4.9188E−03 | 2.6554E−03 |
| A10 = | −8.5810E−06 | 1.8803E−03 | −1.6826E−04 | 1.1688E−04 | 2.0479E−03 | 3.4560E−04 |
| A12 = | — | −3.1179E−04 | 1.3044E−04 | 1.1775E−04 | −5.6253E−04 | −2.0235E−04 |

| Surface # | 8 | 9 | 10 | 11 | 12 | 13 |
|---|---|---|---|---|---|---|
| k = | −7.4535E+01 | −1.0232E+01 | 5.4872E+01 | −8.0147E−01 | −5.7902E−02 | −5.8479E+01 |
| A4 = | −1.2260E−01 | −2.2639E−02 | 1.7569E−03 | 4.3478E−03 | −2.7180E−02 | −7.2582E−03 |
| A6 = | 7.5842E−02 | 2.7206E−02 | 8.8593E−03 | −1.5308E−03 | 3.4637E−03 | −1.5857E−03 |
| A8 = | −5.5004E−02 | −1.4091E−02 | 2.8537E−03 | 5.0148E−03 | 1.2827E−03 | 5.6070E−04 |
| A10 = | 2.6164E−02 | 4.3509E−03 | −3.2544E−03 | −1.9549E−03 | −4.0005E−04 | −8.5071E−05 |
| A12 = | −6.2168E−03 | −6.7696E−04 | 1.0039E−03 | 6.2616E−04 | 4.0759E−05 | 7.7640E−06 |
| A14 = | 5.9663E−04 | 3.9251E−05 | −1.1138E−04 | −7.8652E−05 | −1.2459E−06 | −4.8145E−07 |
| A16 = | — | — | — | — | −1.7245E−08 | 1.4944E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.21 | (T12 + T56)/BL | 4.14 |
| Fno | 2.04 | (T12 + T56)/Dr5r10 | 0.99 |
| HFOV [deg.] | 67.5 | ΣCT/(CT2 + CT3) | 1.75 |
| CRA [deg.] | 33.3 | sag62/CT6 | −1.11 |
| V2 + V4 | 79.4 | (R11 + R12)/(R11 − R12) | −0.22 |
| T12/T56 | 1.06 | (f/f3) − (f/f4) | 2.22 |
| (T12 + T56)/(T23 + T34 + T45) | 7.56 | |Sd11/Sd62| | 0.96 |

6th Embodiment

Figure 11:
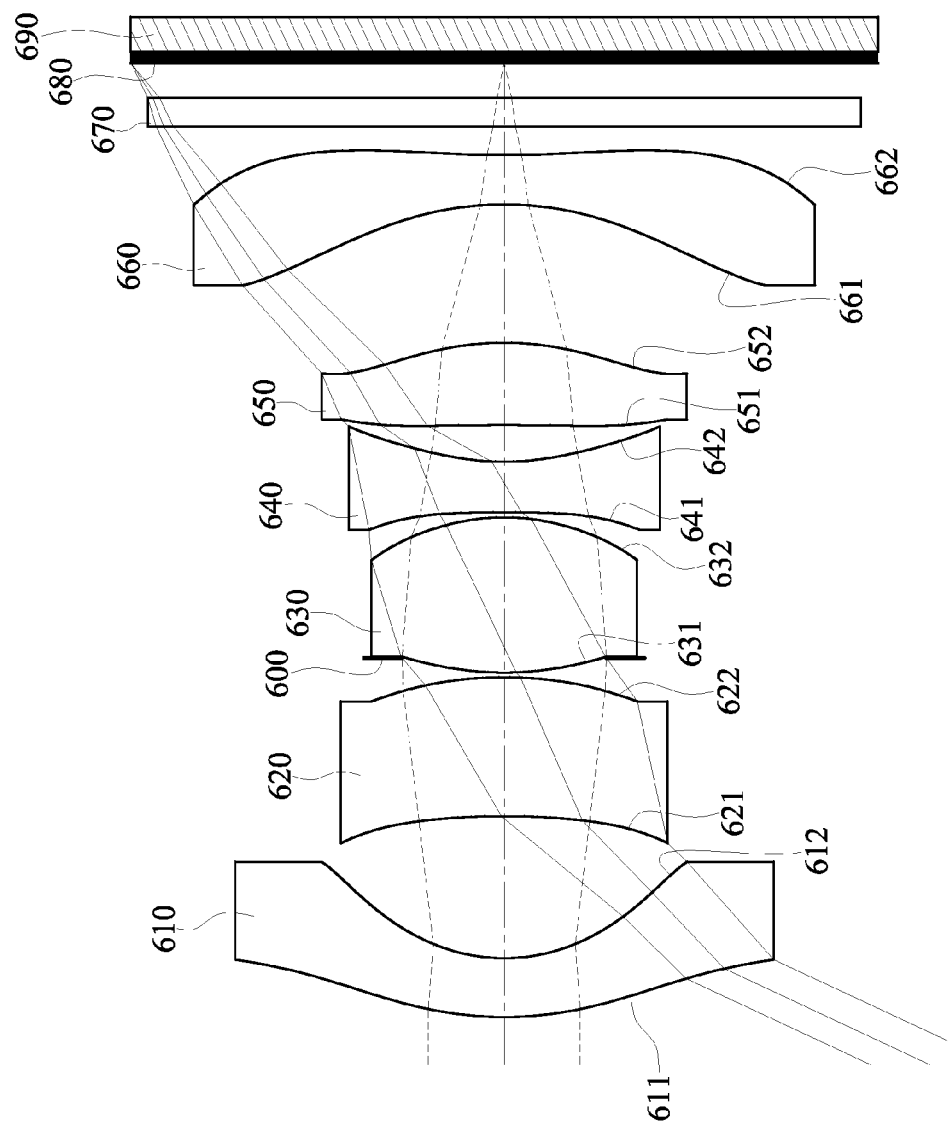
FIG. 11 is a schematic view of an image capturing unit according to the 6th embodiment of the present disclosure.
Figure 12:
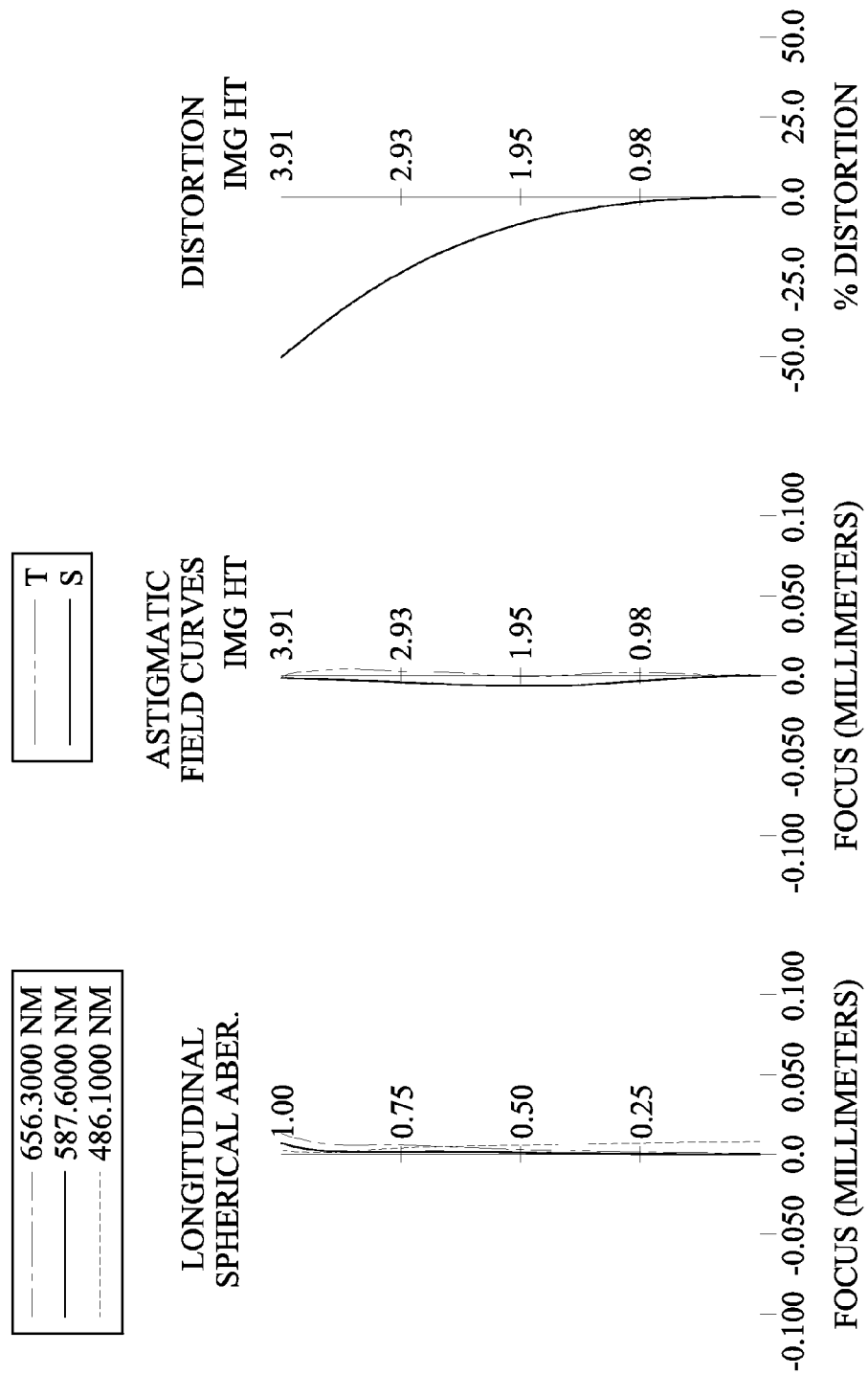
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image surface 680, wherein the photographing optical lens assembly has a total of six single and non-cemented lens elements (610-660).

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has at least one concave shape in an off-axis region thereof.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. Both the object-side surface 651 and the image-side surface 652 of the fifth lens element 650 have at least one inflection point.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one convex shape in an off-axis region thereof.

The IR-cut filter 670 is made of glass and located between the sixth lens element 660 and the image surface 680, and will not affect the focal length of the photographing optical lens assembly. The image sensor 690 is disposed on or near the image surface 680 of the photographing optical lens assembly.

In this embodiment, an axial distance T23 between the second lens element 620 and the third lens element 630, where the aperture stop 600 is located, is the shortest among all axial distances T12, T23, T34, T45 and T56 between every two of the first lens element 610, the second lens element 620, the third lens element 630, the fourth lens element 640, the fifth lens element 650 and the sixth lens element 660 that are adjacent to each other.

The detailed optical data of the 6th embodiment are shown in Table 11 and the aspheric surface data are shown in Table 12 below.

TABLE 11

6th Embodiment
f = 3.88 mm, Fno = 2.44, HFOV = 65.0 deg.

| Surface # | | Curvature Radius | Thickness | | Material | Index | Abbe # | Focal Length |
|---|---|---|---|---|---|---|---|---|
| 0 | Object | Plano | Infinity | | | | | |
| 1 | Lens 1 | 3.769 | (ASP) | 0.617 | Plastic | 1.544 | 55.9 | −8.26 |
| 2 | | 1.932 | (ASP) | 1.489 | | | | |
| 3 | Lens 2 | −7.996 | (ASP) | 1.455 | Plastic | 1.544 | 55.9 | 14.31 |
| 4 | | −4.198 | (ASP) | 0.202 | | | | |
| 5 | Ape. Stop | Plano | | −0.152 | | | | |
| 6 | Lens 3 | 3.317 | (ASP) | 1.627 | Plastic | 1.544 | 55.9 | 2.70 |
| 7 | | −2.174 | (ASP) | 0.052 | | | | |
| 8 | Lens 4 | −22.033 | (ASP) | 0.530 | Plastic | 1.639 | 23.5 | −3.50 |
| 9 | | 2.517 | (ASP) | 0.386 | | | | |

TABLE 11-continued

6th Embodiment
f = 3.88 mm, Fno = 2.44, HFOV = 65.0 deg.

| Surface # | | Curvature Radius | | Thickness | Material | Index | Abbe # | Focal Length |
|---|---|---|---|---|---|---|---|---|
| 10 | Lens 5 | −32.599 | (ASP) | 0.863 | Plastic | 1.544 | 55.9 | 6.03 |
| 11 | | −3.007 | (ASP) | 1.449 | | | | |
| 12 | Lens 6 | −3.430 | (ASP) | 0.518 | Plastic | 1.544 | 55.9 | −4.73 |
| 13 | | 10.850 | (ASP) | 0.300 | | | | |
| 14 | IR-cut filter | Plano | | 0.300 | Glass | 1.517 | 64.2 | — |
| 15 | | Plano | | 0.365 | | | | |
| 16 | Image | Plano | | — | | | | |

Note:
Reference wavelength is 587.6 nm (d-line).

TABLE 12

Aspheric Coefficients

| Surface # | 1 | 2 | 3 | 4 | 6 | 7 |
|---|---|---|---|---|---|---|
| k = | −7.2513E−01 | −7.3563E−01 | −7.4048E+01 | −4.2933E+00 | 1.1483E+00 | −4.8697E−01 |
| A4 = | −1.9725E−04 | 1.5388E−02 | −2.1351E−02 | −1.3148E−02 | −1.0222E−02 | 4.4298E−02 |
| A6 = | −2.8208E−03 | −4.5116E−03 | 4.9717E−03 | −4.0428E−04 | −1.0645E−03 | −4.3986E−02 |
| A8 = | 3.4282E−04 | 4.7475E−04 | −2.7466E−03 | 8.3617E−04 | −4.2807E−03 | 2.4696E−02 |
| A10 = | −1.5633E−05 | 1.5726E−04 | 4.3372E−04 | −6.6283E−05 | 3.2199E−03 | −8.8740E−03 |
| A12 = | 2.4007E−07 | −7.4757E−05 | 1.4240E−06 | 3.8437E−05 | −1.2692E−03 | 1.3268E−03 |

| Surface # | 8 | 9 | 10 | 11 | 12 | 13 |
|---|---|---|---|---|---|---|
| k = | −7.1058E+01 | −1.1766E+01 | 5.4872E+01 | −4.5211E−01 | −5.4250E−02 | −5.7462E+01 |
| A4 = | −4.3706E−02 | 5.2636E−03 | 1.0499E−03 | 9.8766E−03 | −1.4542E−03 | −5.7387E−03 |
| A6 = | 1.2156E−02 | 4.6728E−03 | 8.6800E−03 | 2.5355E−03 | 1.0034E−03 | −1.4821E−03 |
| A8 = | −1.5556E−02 | −5.1849E−03 | −1.6016E−03 | 6.8743E−04 | 6.8754E−04 | 5.8416E−04 |
| A10 = | 1.2320E−02 | 2.9221E−03 | −3.7647E−03 | −1.3659E−04 | −2.3659E−04 | −1.0936E−04 |
| A12 = | −4.8132E−03 | −7.9705E−04 | 2.2291E−04 | 5.0595E−05 | 3.4060E−05 | 1.1129E−05 |
| A14 = | 7.9096E−04 | 9.0021E−05 | −3.3617E−05 | −1.0122E−05 | −2.3078E−06 | −6.1745E−07 |
| A16 = | — | — | — | — | 6.0881E−08 | 1.4818E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.88 | (T12 + T56)/BL | 3.04 |
| Fno | 2.44 | (T12 + T56)/Dr5r10 | 0.85 |
| HFOV [deg.] | 65.0 | ΣCT/(CT2 + CT3) | 1.82 |
| CRA [deg.] | 32.0 | sag62/CT6 | −1.01 |
| V2 + V4 | 79.4 | (R11 + R12)/(R11 − R12) | −0.52 |
| T12/T56 | 1.03 | (f/f3) − (f/f4) | 2.55 |
| (T12 + T56)/(T23 + T34 + T45) | 6.02 | |Sd11/Sd62| | 0.87 |

7th Embodiment

Figure 13:
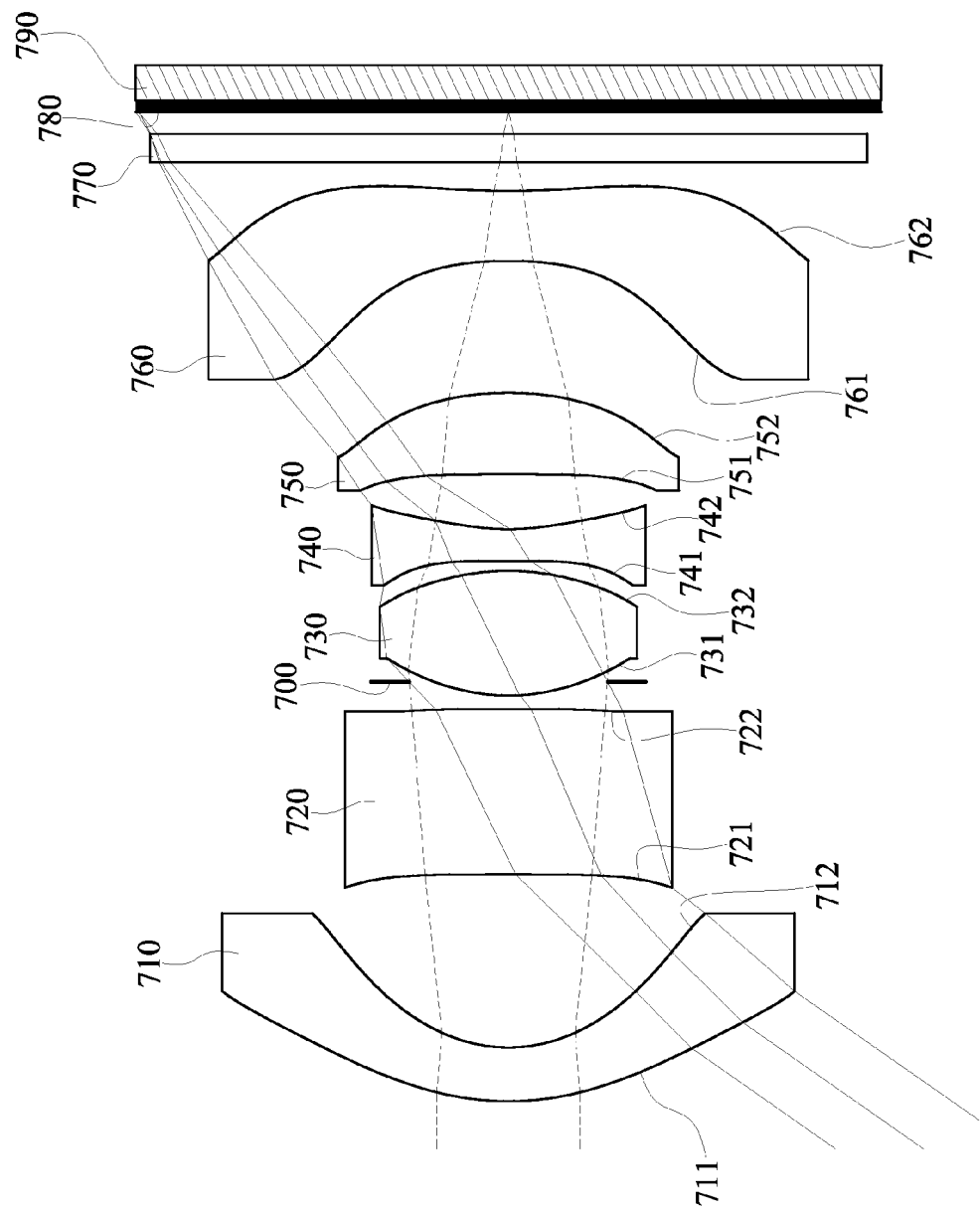
FIG. 13 is a schematic view of an image capturing unit according to the 7th embodiment of the present disclosure.
Figure 14:
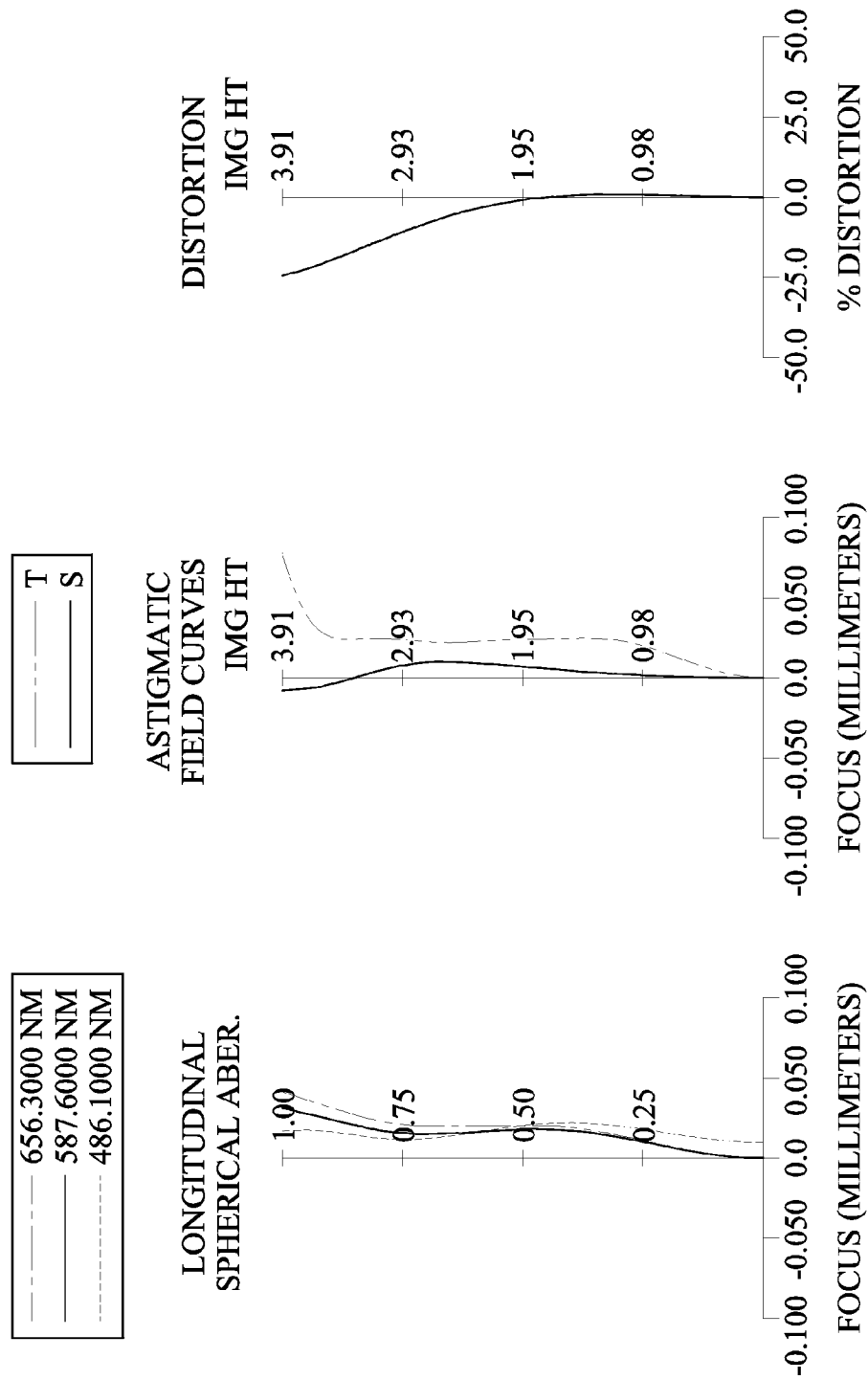
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 790. The photographing optical lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 770 and an image surface 780, wherein the photographing optical lens assembly has a total of six lens elements (710-760). The first lens element 710, the second lens element 720, the third lens element 730, the fourth lens element 740, the fifth lens element 750 and the sixth lens element 760 are all single and non-cemented lens elements.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has at least one concave shape in an off-axis region thereof.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric. Both the object-side surface 751 and the image-side surface 752 of the fifth lens element 750 have at least one inflection point.

The sixth lens element 760 with negative refractive power has an object-side surface 761 being concave in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one convex shape in an off-axis region thereof.

The IR-cut filter 770 is made of glass and located between the sixth lens element 760 and the image surface 780, and will not affect the focal length of the photographing optical lens assembly. The image sensor 790 is disposed on or near the image surface 780 of the photographing optical lens assembly.

The detailed optical data of the 7th embodiment are shown in Table 13 and the aspheric surface data are shown in Table 14 below.

TABLE 13

7th Embodiment
f = 3.67 mm, Fno = 2.45, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.967 | (ASP) | 0.564 | Plastic | 1.514 | 56.8 | −7.96 |
| 2 | | 1.609 | (ASP) | 1.816 | | | | |
| 3 | Lens 2 | −96.218 | (ASP) | 1.733 | Plastic | 1.639 | 23.5 | −72.17 |
| 4 | | 89.180 | (ASP) | 0.284 | | | | |
| 5 | Ape. Stop | Plano | | −0.141 | | | | |
| 6 | Lens 3 | 2.075 | (ASP) | 1.307 | Plastic | 1.544 | 55.9 | 2.29 |
| 7 | | −2.434 | (ASP) | 0.104 | | | | |
| 8 | Lens 4 | 127.026 | (ASP) | 0.333 | Plastic | 1.639 | 23.5 | −3.84 |
| 9 | | 2.407 | (ASP) | 0.576 | | | | |
| 10 | Lens 5 | 333.926 | (ASP) | 0.853 | Plastic | 1.544 | 55.9 | 6.16 |
| 11 | | −3.382 | (ASP) | 1.384 | | | | |
| 12 | Lens 6 | −4.218 | (ASP) | 0.734 | Plastic | 1.544 | 55.9 | −5.03 |
| 13 | | 8.273 | (ASP) | 0.300 | | | | |
| 14 | IR-cut filter | Plano | | 0.300 | Glass | 1.517 | 64.2 | — |
| 15 | | Plano | | 0.232 | | | | |
| 16 | Image | Plano | | — | | | | |

Note:
Reference wavelength is 587.6 nm (d-line).

TABLE 14

| Aspheric Coefficients | | | | | | |
|---|---|---|---|---|---|---|
| Surface # | 1 | 2 | 3 | 4 | 6 | 7 |
| k = | −3.7555E−01 | −7.3758E−01 | −9.0000E+01 | 9.0000E+01 | −1.7584E+00 | −9.5627E−01 |
| A4 = | −6.0623E−03 | 5.3221E−03 | −8.3103E−03 | −3.8363E−02 | −1.2807E−02 | 3.2743E−02 |
| A6 = | −8.2407E−04 | −1.6332E−03 | −3.8337E−04 | 2.5511E−02 | 3.5884E−02 | −2.4595E−02 |
| A8 = | 5.2868E−05 | 4.2464E−04 | −1.3606E−03 | −1.3907E−02 | −2.8443E−02 | 2.0389E−03 |
| A10 = | 6.3975E−08 | −2.3458E−05 | 2.7192E−04 | 4.5655E−03 | 1.4254E−02 | 1.3745E−03 |
| A12 = | — | −2.9359E−05 | −4.8561E−06 | −8.3979E−05 | −3.3714E−03 | −4.3745E−04 |

| Surface # | 8 | 9 | 10 | 11 | 12 | 13 |
|---|---|---|---|---|---|---|
| k = | 9.0000E+01 | −1.4154E+01 | −8.4057E+01 | 2.1494E+00 | 8.5455E−01 | −5.7470E+01 |
| A4 = | −1.3462E−01 | −3.7487E−02 | −3.5921E−02 | −2.0335E−02 | −5.5682E−02 | −4.1161E−03 |
| A6 = | 1.1078E−01 | 4.6688E−02 | 1.2054E−02 | 1.1999E−02 | 5.2096E−03 | −6.5013E−03 |
| A8 = | −1.3091E−01 | −3.6900E−02 | −8.8234E−03 | −1.1353E−02 | 1.3181E−03 | 2.6300E−03 |
| A10 = | 9.0779E−02 | 2.0543E−02 | 3.0460E−03 | 6.6422E−03 | −7.1679E−04 | −5.8095E−04 |
| A12 = | −3.8213E−02 | −6.7242E−03 | −3.4352E−04 | −2.0892E−03 | 2.2796E−04 | 7.1737E−05 |
| A14 = | 7.5595E−03 | 1.0546E−03 | −3.4722E−05 | 3.0521E−04 | −3.1358E−05 | −4.6588E−06 |
| A16 = | — | — | — | — | 1.5042E−06 | 1.2516E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.67 | (T12 + T56)/BL | 3.85 |
| Fno | 2.45 | (T12 + T56)/Dr5r10 | 1.01 |
| HFOV [deg.] | 55.0 | ΣCT/(CT2 + CT3) | 1.82 |
| CRA [deg.] | 33.0 | sag62/CT6 | −1.00 |
| V2 + V4 | 47.0 | (R11 + R12)/(R11 − R12) | −0.32 |
| T12/T56 | 1.31 | (f/f3) − (f/f4) | 2.56 |
| (T12 + T56)/(T23 + T34 + T45) | 3.89 | \|Sd11/Sd62\| | 0.95 |

The foregoing image capturing unit is able to be installed in, but not limited to, an electronic device, including smart phones, tablet personal computers and wearable devices.

According to the present disclosure, both the first lens element and the sixth lens element have negative refractive power, and both the object-side surface and the image-side surface of the sixth lens element are concave in a paraxial region thereof. Therefore, the refractive power distribution of the first through sixth lens elements and the shape of the sixth lens element are favorable for enlarging the field of view and reducing the total track length of the photographing optical lens assembly so as to improve the image quality. When specific conditions are satisfied, the effective imaging areas of the first lens element and the sixth lens element is more proper so that it is favorable for correcting the aberration and the distortion when the two surfaces of the sixth lens element are both aspheric, and thereby further improving the image quality. Moreover, the axial distances between every adjacent two of the second lens element, the third lens element, the fourth lens element, and the fifth lens element are proper so that it is favorable for simultaneously satisfying the requirements of wide field of view, compact size and high image quality.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
a first lens element with negative refractive power having an image-side surface being concave in a paraxial region thereof;
a second lens element;
a third lens element;
a fourth lens element having an image-side surface being concave in a paraxial region thereof;
a fifth lens element; and
a sixth lens element with negative refractive power having an object-side surface being concave in a paraxial region thereof and an image-side surface being concave in a paraxial region thereof, wherein the image-side surface of the sixth lens element has at least one convex shape in an off-axis region thereof, and both the object-side surface and the image-side surface of the sixth lens element are aspheric;
wherein the photographing optical lens assembly has a total of six lens elements; the first lens element, the second lens element, the third lens element, the fourth lens element, the fifth lens element and the sixth lens element are all single and non-cemented lens elements; wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$T12/T56<4.0$; and $1.80<(T12+T56)/(T23+T34+T45)$.

2. The photographing optical lens assembly of claim 1, wherein the axial distance between the first lens element and the second lens element is T12, the axial distance between the fifth lens element and the sixth lens element is T56, and the following condition is satisfied:

$T12/T56<2.0$.

3. The photographing optical lens assembly of claim 2, wherein the axial distance between the first lens element and the second lens element is T12, the axial distance between the fifth lens element and the sixth lens element is T56, and the following condition is satisfied:

$T12/T56<1.5$.

4. The photographing optical lens assembly of claim 1, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the axial distance between the fifth lens element and the sixth lens element is T56, and the following condition is satisfied:

$3.0<(T12+T56)/(T23+T34+T45)$.

5. The photographing optical lens assembly of claim 1, wherein a maximum chief ray angle of the photographing optical lens assembly is CRA, half of a maximal field of view of the photographing optical lens assembly is HFOV, and the following conditions are satisfied:

30 degrees (deg.)<CRA<45 deg.; and 50 deg.<HFOV<85 deg.

6. The photographing optical lens assembly of claim 1, further comprising a stop disposed on a shortest distance among axial distances between any two of the first lens element, the second lens element, the third lens element, the fourth lens element, the fifth lens element and the sixth lens element that are adjacent to each other.

7. The photographing optical lens assembly of claim 1, wherein the fourth lens element has an object-side surface having at least one concave shape in an off-axis region thereof.

8. The photographing optical lens assembly of claim 1, wherein the axial distance between the first lens element and the second lens element is T12, the axial distance between the fifth lens element and the sixth lens element is T56, an axial distance between the image-side surface of the sixth lens element and an image surface is BL, and the following condition is satisfied:

$$2.5<(T12+T56)/BL<6.0.$$

9. The photographing optical lens assembly of claim 1, wherein a maximum effective radius of an object-side surface of the first lens element is Sd11, a maximum effective radius of the image-side surface of the sixth lens element is Sd62, and the following condition is satisfied:

$$0.80<|Sd11/Sd62|<1.10.$$

10. The photographing optical lens assembly of claim 1, wherein a curvature radius of the object-side surface of the sixth lens element is R11, a curvature radius of the image-side surface of the sixth lens element is R12, and the following condition is satisfied:

$$-0.75<(R11+R12)/(R11-R12)<0.$$

11. The photographing optical lens assembly of claim 1, wherein the third lens element has positive refractive power, and the fourth lens element has negative refractive power; all object-side and image-side surfaces of the first lens element, the second lens element, the third lens element, the fourth lens element and the fifth lens element are aspheric.

12. The photographing optical lens assembly of claim 1, wherein an Abbe number of the second lens element is V2, an Abbe number of the fourth lens element is V4, and the following condition is satisfied:

$$35<V2+V4<85.$$

13. The photographing optical lens assembly of claim 1, wherein a focal length of the photographing optical lens assembly is f, a focal length of the third lens element is f3, a focal length of the fourth lens element is f4, and the following condition is satisfied:

$$2.0<(f/f3)-(f/f4)<4.0.$$

14. The photographing optical lens assembly of claim 1, wherein at least one of an object-side surface and an image-side surface of the fifth lens element has at least one inflection point.

15. The photographing optical lens assembly of claim 1, wherein a central thickness of the second lens element is CT2, a central thickness of the third lens element is CT3, a sum of central thicknesses of the first lens element, the second lens element, the third lens element, the fourth lens element, the fifth lens element and the sixth lens element is ΣCT, and the following condition is satisfied:

$$\Sigma CT/(CT2+CT3)<2.5.$$

16. The photographing optical lens assembly of claim 1, wherein a distance in parallel with an optical axis from an intersection point of the image-side surface of the sixth lens element and the optical axis to a position of a maximum effective radius of the image-side surface of the sixth lens element is sag62, a central thickness of the sixth lens element is CT6, and the following condition is satisfied:

$$-1.5<sag62/CT6<-0.30.$$

17. The photographing optical lens assembly of claim 1, wherein a focal length of the i-th lens element is fi, such that a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following condition is satisfied:

$$|f2|>|fi|, \text{ wherein } i=1,3,4,5,6.$$

18. The photographing optical lens assembly of claim 1, wherein the second lens element has an object-side surface being concave in a paraxial region thereof.

19. The photographing optical lens assembly of claim 1, wherein the second lens element has an image-side surface being convex in a paraxial region thereof.

20. The photographing optical lens assembly of claim 1, wherein the axial distance between the first lens element and the second lens element is T12, the axial distance between the fifth lens element and the sixth lens element is T56, an axial distance between an object-side surface of the third lens element and an image-side surface of the fifth lens element is Dr5r10, and the following condition is satisfied:

$$0.80<(T12+T56)/Dr5r10.$$

21. An image capturing unit, comprising:
the photographing optical lens assembly of claim 1; and
an image sensor, wherein the image sensor is disposed on the image side of the photographing optical lens assembly.

22. An electronic device, comprising:
the image capturing unit of claim 21.

* * * * *

UNITED STATES PATENT AND TRADEMARK OFFICE
CERTIFICATE OF CORRECTION

PATENT NO. : 9,557,534 B1
APPLICATION NO. : 14/869301
DATED : January 31, 2017
INVENTOR(S) : Lin-Yao Liao It is certified that error appears in the above-identified patent and that said Letters Patent is hereby corrected as shown below:

In the Specification

10th Column, delete:

"
| TABLE 1 | | | | | | | |
|---|---|---|---|---|---|---|---|
| 1st Embodiment | | | | | | | |
| f = 3.68 mm, Fno = 2.45, HFOV = 57.7 deg. | | | | | | | |
| Surface # | | Curvature Radius | | Thickness | Material | Index | Abbe # | Focal Length |
| 0 | Object | Plano | | Infinity | | | | |
| 1 | Lens 1 | 3.201 | (ASP) | 0.601 | Plastic | 1.544 | 55.9 | -7.43 |
| 2 | | 1.668 | (ASP) | 1.944 | | | | |
| 3 | Lens 2 | 96.963 | (ASP) | 1.397 | Plastic | 1.639 | 23.5 | 30.42 |
| 4 | | -24.175 | (ASP) | 0.193 | | | | |
| 5 | Ape. Stop | Plano | | -0.075 | | | | |
| 6 | Lens 3 | 2638 | (ASP) | 0.996 | Plastic | 1.544 | 55.9 | 2.72 |
| 7 | | -2.933 | (ASP) | 0.100 | | | | |
| 8 | Lens 4 | -48.665 | (ASP) | 0.330 | Plastic | 1.661 | 20.4 | -4.51 |
| 9 | | 3.180 | (ASP) | 0.469 | | | | |
| 10 | Lens 5 | 11.538 | (ASP) | 0.889 | Plastic | 1.544 | 55.9 | 4.96 |
| 11 | | -3.429 | (ASP) | 1.460 | | | | |
| 12 | Lens 6 | -3.333 | (ASP) | 0.846 | Plastic | 1.544 | 55.9 | -4.17 |
| 13 | | 7.725 | (ASP) | 0.300 | | | | |
| 14 | IR-cut filter | Plano | | 0.100 | Glass | 1.517 | 64.2 | - |
| 15 | | Plano | | 0.449 | | | | |
| 16 | Image | Plano | | - | | | | |
| Note: Reference wavelength is 587.6 nm (d-line). | | | | | | | |
"

Signed and Sealed this
Eighteenth Day of June, 2019

Andrei Iancu
*Director of the United States Patent and Trademark Office*

And insert:

| TABLE 1 | | | | | | | |
|---|---|---|---|---|---|---|---|
| 1st Embodiment | | | | | | | |
| f = 3.68 mm, Fno = 2.45, HFOV = 57.7 deg. | | | | | | | |
| Surface # | | Curvature Radius | | Thickness | Material | Index | Abbe # | Focal Length |
| 0 | Object | Plano | | Infinity | | | | |
| 1 | Lens 1 | 3.201 | (ASP) | 0.601 | Plastic | 1.544 | 55.9 | -7.43 |
| 2 | | 1.668 | (ASP) | 1.944 | | | | |
| 3 | Lens 2 | 96.963 | (ASP) | 1.397 | Plastic | 1.639 | 23.5 | 30.42 |
| 4 | | -24.175 | (ASP) | 0.193 | | | | |
| 5 | Ape. Stop | Plano | | -0.075 | | | | |
| 6 | Lens 3 | 2.638 | (ASP) | 0.996 | Plastic | 1.544 | 55.9 | 2.72 |
| 7 | | -2.933 | (ASP) | 0.100 | | | | |
| 8 | Lens 4 | -48.665 | (ASP) | 0.330 | Plastic | 1.661 | 20.4 | -4.51 |
| 9 | | 3.180 | (ASP) | 0.469 | | | | |
| 10 | Lens 5 | 11.538 | (ASP) | 0.889 | Plastic | 1.544 | 55.9 | 4.96 |
| 11 | | -3.429 | (ASP) | 1.460 | | | | |
| 12 | Lens 6 | -3.333 | (ASP) | 0.846 | Plastic | 1.544 | 55.9 | -4.17 |
| 13 | | 7.725 | (ASP) | 0.300 | | | | |
| 14 | IR-cut filter | Plano | | 0.100 | Glass | 1.517 | 64.2 | - |
| 15 | | Plano | | 0.449 | | | | |
| 16 | Image | Plano | | - | | | | |
| Note: Reference wavelength is 587.6 nm (d-line). | | | | | | | | |